(12) United States Patent
Quesada et al.

(10) Patent No.: US 6,726,834 B2
(45) Date of Patent: Apr. 27, 2004

(54) PROCESS FOR CATALYTIC CRACKING OF A HYDROCARBON FEED WITH A MFI ALUMINISILCATE COMPOSITION

(75) Inventors: Andrés M. Quesada, Sanz El Marques Caracas (VE); Gerardo Vitale-Rojas, Los Teques (VE); José Velásquez, Los Teques Edo Miranda (VE); María Nieves Alvarez, Caracas (VE)

(73) Assignee: Intevep, S.A., Caracas (VE)

( * ) Notice: Subject to any disclaimer, the term of this patent is extended or adjusted under 35 U.S.C. 154(b) by 91 days.

(21) Appl. No.: 09/819,876

(22) Filed: Mar. 28, 2001

(65) Prior Publication Data

US 2002/0056662 A1 May 16, 2002

Related U.S. Application Data

(63) Continuation-in-part of application No. 09/425,500, filed on Oct. 22, 1999, now Pat. No. 6,346,224.

(51) Int. Cl.[7] .............................................. C10G 11/05
(52) U.S. Cl. ........................... 208/120.01; 208/120.05; 208/120.15; 208/120.2; 208/120.25; 208/120.3; 208/120.35
(58) Field of Search ................. 208/120.01, 120.05, 208/120.1, 120.15, 120.2, 120.25, 120.3, 120.35

(56) References Cited

U.S. PATENT DOCUMENTS

| | | | | |
|---|---|---|---|---|
| 3,702,886 A | * | 11/1972 | Argauer et al. | 423/705 |
| 3,769,386 A | * | 10/1973 | Rundell et al. | 423/701 |
| 4,497,903 A | | 2/1985 | Kibby et al. | |
| 4,664,898 A | | 5/1987 | Arika et al. | |
| 4,892,720 A | | 1/1990 | Skeels et al. | |
| 4,968,650 A | * | 11/1990 | Chu et al. | 502/61 |
| 5,057,203 A | * | 10/1991 | Chu et al. | 208/120.01 |
| 5,176,817 A | * | 1/1993 | Skeels et al. | 208/108 |
| 5,185,136 A | | 2/1993 | Vaughan et al. | |
| 5,185,138 A | | 2/1993 | Vaughan et al. | |
| 5,271,761 A | * | 12/1993 | Skeels et al. | 95/116 |
| 5,283,047 A | | 2/1994 | Vaughan et al. | |
| 5,314,674 A | | 5/1994 | Di R Francesco et al. | |
| 5,688,975 A | * | 11/1997 | Nair et al. | 208/113 |
| 5,961,818 A | | 10/1999 | Pradhan et al. | |
| 6,117,411 A | * | 9/2000 | Takewaki et al. | 423/326 |
| 6,177,374 B1 | * | 1/2001 | Pradhan et al. | 502/64 |

FOREIGN PATENT DOCUMENTS

| | | |
|---|---|---|
| EP | 0 321 177 | 6/1989 |
| WO | WO 00/00430 | 1/2000 |

* cited by examiner

*Primary Examiner*—Walter D. Griffin
(74) *Attorney, Agent, or Firm*—Bachman & LaPointe, P.C.

(57) ABSTRACT

A process for catalytic cracking of a hydrocarbon feed, includes the steps of providing an initial hydrocarbon fraction; providing a catalyst comprising an aluminosilicate composition having an aluminosilicate composition having an aluminosilicate framework and containing at least one metal other than aluminum incorporated into the aluminosilicate framework; and exposing the hydrocarbon to the catalyst under catalytic cracking conditions so as to provide an upgraded hydrocarbon product.

13 Claims, 28 Drawing Sheets

EXAMPLE 8

S5MG104, S=4305, SR=416.643

EXAMPLE 20

FIG. 11 EXAMPLE 4

FIG. 15 EXAMPLE 12

FIG. 17 EXAMPLE 16

EXAMPLE 18

PROCESS FOR CATALYTIC CRACKING OF A HYDROCARBON FEED WITH A MFI ALUMINISILCATE COMPOSITION

CROSS REFERENCE TO RELATED APPLICATION

This application is a continuation-in-part of co-pending patent application Ser. No. 09/425,500, Filed Oct. 22, 1999, now U.S. Pat. No. 6,346,224.

BACKGROUND OF THE INVENTION

The history of zeolites began with the discovery of stilbite in 1756 by the Swedish mineralogist A. Cronsted. Zeolite means "boiling stone" and refers to the frothy mass which can result when a zeolite is fused in a blowpipe. Volatile zeolitic water forms bubbles within the melt.

Zeolites are crystalline aluminosilicates having as a fundamental unit a tetrahedral complex consisting of $Si^{4+}$ and $Al^{3+}$ in tetrahedral coordination with four oxygens. Those tetrahedral units of $[SiO_4]$ and $[AlO_4]^-$ are linked to each other by shared oxygens and in this way they form three-dimensional networks. The building of such networks produces channels and cavities of molecular dimensions. Water molecules and charged compensating cations are found inside the channels and cavities of the zeolitic networks.

Even though there was much knowledge about zeolites and its properties, it was until the middle of this century that commercial preparation and use of zeolites was possible. This advance allowed more research into the synthesis and modification of zeolitic materials.

The modification of the physical-chemical properties of zeolitic molecular sieve by the incorporation of other elements different from silicon and aluminum can be achieved through one of the following ways:

1.—Incorporation through ion exchange
2.—Incorporation through impregnation
3.—Incorporation into the synthesis gel.

The most common and well known form of introducing different elements in the channels and cavities of zeolitic molecular sieves is through ion exchanging. In this way, the compensating cation balancing the negative charge of the framework (usually sodium) is replaced by a new cation after ion exchange is done. In this case, the new cation is located inside the channels and cavities of the zeolite but, it is not coordinated with the silicon atoms throughout the oxygen atoms.

The incorporation of other chemical elements in the zeolitic molecular sieve through impregnation is another common way of modifying the properties of zeolitic materials. For this case, most of the element incorporated in the zeolite is found in the surface of the crystallites of the zeolitic material.

The incorporation into the synthesis gel of other chemical elements to produce zeolitic molecular sieves allowed an important advance in this area of research. This variation not only has modified the physical-chemical properties of the zeolitic materials of known structures, but also has given rise to the production of new structures unknown in the aluminosilicate frameworks.

Patent and open literature have shown two important groups of zeolitic molecular sieve which incorporate other elements besides silicon and aluminum. These two main groups are the metallosilicates and the metalloaluminosphosphates. The metallosilicates are molecular sieves in which the aluminum is replaced by another element like gallium, iron, boron, titanium, zinc, etc. The metalloaluminophosphates are molecular sieves in which the aluminophosphate framework is modified by the incorporation of another element like magnesium, iron, cobalt, zinc, etc.

Because the present invention is more related to metallosilicates than to metalloaluminophosphates, the metallosilicates are discussed in more detail. To choose an element to be incorporated into the molecular sieve framework, researchers take into account the possibility that the chosen element can attain tetrahedral coordination as well as the ionic ratio radius of such element. Table 1 shows the elements that can attain a tetrahedral coordination as well as the ionic ratio radius of such elements.

Some of the elements indicated in Table 1 have been claimed to be incorporated into molecular sieve structures of the metallosilicate type. Some examples are: Ironsilicates or Ferrisilicates [U.S. Pat. Nos. 5,013,537; 5,077,026; 4,705,675; 4,851,602; 4,868,146 and 4,564,511], zincosilicates [U.S. Pat. Nos. 5,137,706; 4,670,617; 4,962,266; 4,329,328; 3,941,871 and 4,329,328], gallosilicates [U.S. Pat. Nos. 5,354,719; 5,365,002; 4,585,641; 5,064,793; 5,409,685; 4,968,650; 5,158,757; 5,133,951; 5,273,737; 5,466,432 and 5,035,868], zirconosilicates [Rakshe et al, Journal of Catalysis, 163: 501–505, 1996; Rakshe et al, Catalysis Letters, 45: 41–50, 1997; U.S. Pat. Nos. 4,935,561 and 5,338,527], chromosilicates [U.S. Pat. Nos. 4,299,808; 4,405,502; 4,431,748; 4,363,718; and 4,4534,365], magnesosilicates [U.S. Pat. Nos. 4,623,530 and 4,732,747] and titanosilicates [U.S. Pat. Nos. 5,466,835; 5,374,747; 4,827,068; 5,354,875 and 4,828,812].

Table 1 Metal ions that can attain tetrahedral coordination and their ionic crystal radii.

TABLE 1

| Metal ion | Radius (Å) | Metal ion | Radius (Å) |
| --- | --- | --- | --- |
| $Al^{3+}$ | 0.530 | $Mg^{2+}$ | 0.710 |
| $As^{5+}$ | 0.475 | $Mn^{2+}$ | 0.800 |
| $B^{3+}$ | 0.250 | $Mn^{4+}$ | 0.530 |
| $Be^{2+}$ | 0.410 | $Mn^{5+}$ | 0.470 |
| $Co^{2+}$ | 0.720 | $Mn^{6+}$ | 0.395 |
| $Cr^{4+}$ | 0.550 | $Ni^{2+}$ | 0.620 |
| $Cr^{5+}$ | 0.485 | $P^{5+}$ | 0.310 |
| $Fe^{2+}$ | 0.770 | $Si^{4+}$ | 0.400 |
| $Fe^{3+}$ | 0.630 | $Sn^{4+}$ | 0.690 |
| $Ga^{3+}$ | 0.610 | $Ti^{4+}$ | 0.560 |
| $Ge^{4+}$ | 0.530 | $V^{5+}$ | 0.495 |
| $Hf^{4+}$ | 0.720 | $Zn^{2+}$ | 0.740 |
| $In^{3+}$ | 0.760 | $Zr^{4+}$ | 0.730 |

The conventional preparation of metallosilicates succeeds only if organic structure guiding compounds ("organic templates") are added to the synthesis mixture. In general, tetraalkylammonium compounds, tertiary and secondary amines, alcohols, ethers, and heterocyclic compounds are used as organic templates.

All these known methods of producing metallosilicates have a series of serious disadvantages if it is desired to produce them in a commercial scale. For instance, those organic templates used are toxic and easily flammable so, since the synthesis must be carried out under hydrothermal conditions and a high pressure in autoclaves, an escape of these templates into the atmosphere can never be completely prevented. Also, the use of templates increases the cost of production of the material because the template is expensive and because the effluent from the production of the metallosilicate also contains toxic materials which require expensive and careful disposal in order to prevent contamination of the environment.

Adding to this, the metallosilicate obtained has organic material inside the channels and cavities so, to be useful as a catalyst or adsorbent, this organic material must be removed from the lattice. The removal of the organic template is carried out by combustion at high temperatures. The removal of the template can cause damage to the lattice structure of the metallosilicate molecular sieve and thus diminish its catalytic and adsorption properties.

The metalloaluminosilicate is another group of zeolitic molecular sieves that can be prepared, however, research in this area is not as popular as it is with the metalloaluminophosphates and metallosilicates. In spite of that, in the patent literature it is possible to find some examples of this type of materials. The preparation of iron- titano- and galloaluminosilicates can be found in U.S. Pat. Nos. 5,176,817; 5,098,687, 4,892,720; 5,233,097; 4,804,647; and 5,057,203. For those cases, the preparation of the material is by a post synthesis treatment. An aluminosilicate zeolite is put in contact with a slurry of a fluoro salt of titanium or/and iron or a gallium salt and then some of the aluminum is replaced by titanium, iron or gallium. This methodology has some disadvantages because of the extra steps required to produce the material.

The ideal thing to do would be to add the desired element into the synthesis gel and then through a hydrothermal process get the metalloaluminosilicate material. In the patent literature is possible to find some examples of this type of procedure. U.S. Pat. No. 5,648,558 teaches the preparation and use of metalloaluminosilicates of the BEA topology with chromium, zinc, iron, cobalt, gallium, tin, nickel, lead, indium, copper and boron. U.S. Pat. No. 4,670,474 teaches the preparation of ferrimetallosilicates with aluminum, titanium, and manganese. U.S. Pat. No. 4,994,250 teaches the preparation of a galloaluminosilicate material having the OFF topology. U.S. Pat. Nos. 4,761,511; 5,456,822; 5,281,566; 5,336,393; 4,994,254 teach the preparation of galloaluminosilicates of the MFI topology. U.S. Pat. No. 5,354,719 teaches the preparation of metalloaluminosilicates of the MFI topology with gallium and chromium. These examples of metalloaluminosilicates require the use of organic templates or seeding procedures so, these methods of preparation of metalloaluminosilicates have similar problems to those described above for metallosilicate methods of preparation.

SUMMARY OF THE INVENTION

The invention presents a new method for obtaining a new family of aluminosilicate and metalloaluminosilicate materials of MFI topology, and their use in the FCC area.

The synthetic metalloaluminosilicates produced with this inventive method have physical and chemical characteristics which make them clearly distinguishable from other products. The methodology does not use organic templates or seeding procedures. The preparation method developed in the invention allows the incorporation in the synthesis gel of other elements of the periodic table and they are interacted with the source of silicon in an acid medium. In this way, the elements are incorporated in the material prepared and those elements are not ion-exchangeable when the final material is obtained.

The elements that can be incorporated into the aluminosilicate framework of the present invention include those elements from the Groups IIA, IIIB, IVB, VB, VIB, VIIB, VIII, IB, IIB, IIIA, IVA, and VA (using the CAS version nomenclature) of the periodic table. Examples of these are shown in Table 1. The amount of such elements present in the aluminosilicate framework of the present invention may vary depending on the required amount of such element in said material. Also, it is possible to mix more than two elements in a given material of the present invention. However, for all compositions of the present invention, it is a characteristic that at least some of the incorporated elements are not ion-exchangeable by conventional techniques and are present in the aluminosilicate material. The new compositions exhibit X-ray diffraction diagrams which contain certain definable minimum lattice distances. Furthermore, the new metalloaluminosilicate materials show specific absorption bands in the infrared spectrum. Also, the new materials show specific bands in the NMR spectrum analysis.

The method developed for preparing metalloaluminosilicate materials can also be used for preparing aluminosilicate material such as ST5 (U.S. Pat. No. 5,254,327) and other MFI type materials of higher Si/Al ratios given the right conditions.

The materials of the present invention have a composition which may be expressed according to one of the formulas given below in terms of molar ratios of oxides:

1.—a $(M_{2/n}O):b(Al_2O_3):c(E_2O_3):d(SiO_2):e(H_2O)$
2.—a$(M_{2/n}O):b(Al_2O_3):c(FO_2):d(SiO_2):e(H_2O)$
3.—a$(M_{2/n}O):b(Al_2O_3):c(GO):d(SiO_2):e(H_2O)$
4.—a$(M_{2/n}O):b(Al_2O_3):c(H_2O_5):d(SiO_2):e(H_2O)$ where M is at least one ion-exchangeable cation having a valence of n; E is an element with valence 3+ which is not ion-exchangeable by conventional means; F is an element with valence 4+ which is not ion-exchangeable by conventional means; G is an element with valence 2+which is not ion-exchangeable by conventional means; H is an element with valence 5+ which is not ion-exchangeable by conventional means; a/b>0; c/b>0; d/b>0; d/c>0; e/b>0; a/(b+c)>0; d/(b+c)>0; a is from >0 to 6, b is equal to 1, c is from >0 to 10, d is from 10 to 80 and e is from 0 to 100.

The invention is not limited to such wet materials or oxide forms, rather its composition may be present in terms of oxides and on a wet basis (as in the above formulas) in order to provide a means for identifying some of the novel compositions. Furthermore, compositions of the present invention may also incorporate more than one element which are not ion-exchangeable and have different valences (mixtures of E, F, G and H). Other formulas may be written by those skilled in the art to identify particular subsets or embodiments of the present invention which comprises porous crystalline metalloaluminosilicates.

Metalloaluminosilicates of the present invention have useful properties including catalytic activity. These novel compositions may be advantageously employed in known processes which presently use aluminosilicate zeolites. Aluminosilicate compositions of the present invention may be advantageously incorporated with binders, clays, aluminas, silicas, or other materials which are well-known in the art. They also can be modified with one or more elements or compounds by deposition, occlusion, ion-exchange or other techniques known to those skilled in the art to enhance, supplement or alter the properties or usefulness of the aluminosilicate compositions of the present invention. The metalloaluminosilicates of the present invention can be used as additive in the FCC area.

The metalloaluminosilicates of the present invention are prepared by hydrothermal methods and, therefore, the elements incorporated in the aluminosilicate compositions are not ion-exchangeable and form part of the structure of the crystalline aluminosilicate composition.

The aluminosilicate containing metal within the aluminosilicate framework in accordance with the present invention is particularly useful in catalytic cracking processes. In accordance with the invention, aluminosilicate compositions, especially having MFI topology, can be prepared with one or more metal within the aluminosilicate framework and used as an additive, or itself as a catalyst, in fluid catalytic cracking. In such processes, one or more metal can be selected for use in the catalyst and process of the present invention for various different process benefits including increase in production of LGP, improvement in LPG quality, reduction in losses of gasoline fractions, higher HCO conversion rates, reduction of gasoline sulfur content and the like.

According to the invention, a process is provided which comprises the steps of providing an initial hydrocarbon fraction; providing a catalyst comprising an aluminosilicate composition having an aluminosilicate composition having an aluminosilicate framework and containing at least one metal other than aluminum incorporated into said aluminosilicate framework; and exposing said hydrocarbon to said catalyst under catalytic cracking conditions so as to provide an upgraded hydrocarbon product.

BRIEF DESCRIPTION OF THE DRAWINGS

A detailed description of preferred embodiments of the invention follows, with reference to the attached drawings wherein.

DETAILED DESCRIPTION OF THE INVENTION

Figure 1:
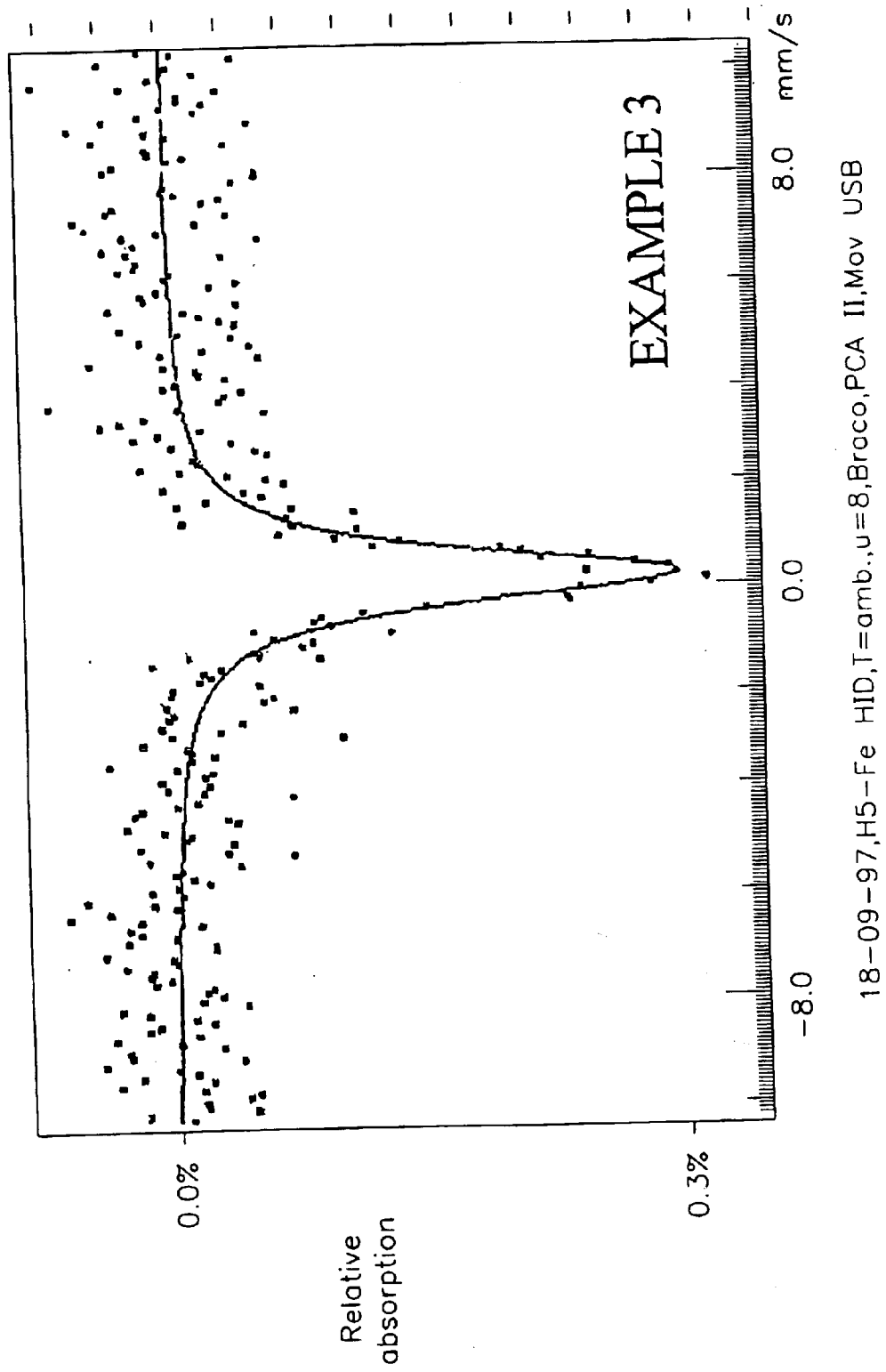
FIG. 1 is a Mossbauer spectrum of the product of Example 3.

The invention relates to a method for obtaining a new family of metalloaluminosilicate materials of MFI topology and their use in the FCC area. The materials are produced with a simple and advantageously inorganic aqueous alkaline reaction mixture under mild hydrothermal conditions.

The invention further relates to an ST-5 type metalloaluminosilicate and a method for preparing same. In accordance with the invention, the metalloaluminosilicate is advantageously prepared without the need for templating agents and/or seeding procedures. In addition, the method of the present invention advantageously results in a desired metal being located in the crystalline structure or framework of the aluminosilicate material.

The compositions are prepared from a synthesis gel which is provided in a sequential manner. The preparation of the synthesis gel is carried out by mixing three solutions: an acid solution of the salt of the element to be incorporated, a solution of a silica source and a solution of an alumina source.

The salts of the elements to be incorporated are preferably nitrates, chlorides, sulfates, bromides, and the like.

Acidification of the solution can be done with one or more of sulfuric acid, nitric acid, hydrochloric acid and the like.

The preferred sources of silica are sodium silicate, sodium metalsilicate, colloidal silica and the like. The preferred sources of alumina are sodium aluminate, aluminum nitrate, aluminum sulfate, and so on. The solution of the element to be incorporated is preferably prepared by dissolving a weight of the salt in a volume of a diluted acid solution.

The solution of the silica source is prepared by diluting or dissolving an amount of a soluble silica source in a volume of water.

The solution of the alumina source is prepared by dissolving a weight of the aluminum salt in an amount of water.

The metal to be incorporated into the metalloaluminosilicate according to the invention may suitably be one or more metals from Groups IIA, IIIB, IVB, VB, VIB, VIIB, VIII, IB, IIB, IIIA, IIA, IVA, and VA (CAS), more preferably iron, zinc, zirconium, chromium, nickel, cobalt, magnesium, phosphorous, gallium and mixtures thereof. Particularly desirable metals are iron, zinc and mixtures thereof.

According to the invention, mixing is carried out in a sequential way. The preferred sequence of mixing is, first, to slowly add silica solution under vigorous stirring over the acid solution of the element to be incorporated. After homogenization of the mixture formed, the solution of alumina is added under vigorous stirring. The final mixture is allowed to homogenize for a given period of time.

The gel composition for preparing these metalloaluminosilicate materials is given in the form of molar ratios of elements as follow:

$SiO_2/Al_2O_3$ from 5 to 80,
$SiO_2/DO_x$ from 10 to 1500,
$SiO_2/(Al_2O_3+DO_x)$ from 5 to 70,
$Na_2O/SiO_2$ from 0.22 to 2.20,
$OH/SiO_2$ from 0.01 to 2.00,
$H_2O/SiO_2$ from 14 to 40, where D is the element or elements incorporated into the gel.

After homogenization is complete the gel is transferred to an autoclave where hydrothermal crystallization preferably is done. The temperature of the crystallization is preferably in the range of 150° C. to 220° C. with a more preferred range of 165° C. to 185° C. The agitation during crystallization is done with a speed preferably ranging between 40 RPM and 400 RPM, the preferred range is 80 RPM to 300 RPM. The crystallization time preferably ranges from 24 hours to 120 hours with a more preferred range between 36 hours and 76 hours. The crystallization is done at autogenous pressure. After the crystallization time is finished, the aluminosilicate composition is filtered, and washed with water preferably until reaching a pH close to 7. The filtered, washed material is then put to dry at a temperature preferably ranging from 80° C. to 140° C. for a period of about 12 hours.

The metalloaluminosilicate materials obtained according to the invention preferably have a chemical composition which can be described in molar ratios using one of the following formulas:

1.—$a(M_{2/n}O):b(Al_2O_3):c(E_2O_3):d(SiO_2):e(H_2O)$
2.—$a(M_{2/n}O):b(Al_2O_3):c(FO_2):d(SiO_2):e(H_2O)$
3.—$a(M_{2/n}O):b(Al_2O_3):c(GO):d(SiO_2):e(H_2O)$
4.—$a(M_{2/n}O):b(Al_2O_3):c(H_2O_5):d(SiO_2):e(H_2O)$ where M is at least one ion-exchangeable cation having a valence of n, the preferred alkali cation is sodium, however, other alkali cations (lithium, potassium and the like) can be employed; E is an element with valence 3+ which is not ion-exchangeable by conventional means, suitable examples include iron, gallium, chromium, boron, indium and the like; F is an element with valence 4+ which is not ion-exchangeable by conventional means, suitable examples include titanium, zirconium, germanium, and the like; G is an element with valence 2+ which is not ion-exchangeable by conventional means, suitable examples include nickel, zinc, cobalt, magnesium, beryllium and the like; H is an element with valence 5+ which is not ion-exchangeable by conventional means, suitable examples include phosphorous, vanadium and the like; a is from >0 to 6; b is equal to 1, c is from >0 to 10; d is from 10 to 80; d/c is from 10 to 1500; e is from 0 to 100; a/(b+c) is from >0 to 5; and d/(b+c) is from 10 to 70.

The invention is not limited to such wet materials or said oxide forms, rather its composition may be present in terms of oxides and on a wet basis (as in the above formulas) in order to provide a means for identifying some of the novel compositions. Furthermore, compositions of the present invention may also incorporate more than one element which are not ion-exchangeable and have different valences (mixtures of E, F, G and H). Other formulas may be written by those skilled in the art to identify particular subsets or embodiments of the present invention which comprises porous crystalline metalloaluminosilicates.

The present invention advantageously provides a metalloaluminosilicate composition wherein the metal is incorporated into the aluminosilicate framework of the composition. As used herein, the term incorporated means the metal cannot be removed through ion exchange procedure.

In conjunction with the above chemical composition, the metalloaluminosilicates produced with the methodology of the present invention show an X-ray diffraction diagram which contains at least the lattice distances that are listed in Table 2 below.

TABLE 2

| Interplanar spacing | Relative intensity |
| --- | --- |
| 11.2 ± 0.4 | strong |
| 10.0 ± 0.4 | strong |
| 6.01 ± 0.2 | weak |
| 5.72 ± 0.2 | weak |
| 5.58 ± 0.2 | weak |
| 4.38 ± 0.1 | weak |
| 3.86 ± 0.1 | very strong |
| 3.73 ± 0.1 | strong |
| 3.65 ± 0.1 | strong |
| 3.49 ± 0.1 | weak |
| 3.23 ± 0.1 | weak |
| 3.06 ± 0.06 | weak |
| 3.00 ± 0.06 | weak |
| 2.00 ± 0.04 | weak |

In addition to the above chemical composition and lattice distances listed in Table 2, the metalloaluminosilicates produced according to this invention have absorption bands in the infrared spectrum and NMR spectra which make them different from other materials. Other techniques can be used in some specific cases like Mossbauer spectroscopy for iron, XPS for magnesium, etc.

Infrared spectroscopy is a simple but powerful technique that can yield information concerning structural details of zeolitic materials. The region from 400 to 1500 cm−1 is important because in that region can be observed different sets of infrared vibrations related to zeolitic materials, for instance, the internal tetrahedral and external linkages. The infrared spectrum can be classified into two groups of vibrations: 1.—internal vibrations of the framework TO4, which are insensitive to structural vibrations; and 2.—vibrations related to the external linkage of the TO4 units in the structure. The latter are sensitive to structural variations. This technique has been employed to identify framework incorporation of other elements. Modifications and shift in the asymmetric and symmetric vibrations have been observed with successful incorporation of such new elements in the framework of the zeolitic material. For this reason this is an important characterization of the metalloaluminosilicate materials of the present invention.

Another important characterization of the metalloaluminosilicates of the present invention is $^{29}Si$ NMR spectroscopy. In silicate systems the Q-unit is used to indicate the different silicate atoms in a system. However, this notation is not sufficient to describe the basic building units in the zeolite or aluminosilicate frameworks. In the zeolite systems, the Q-units are always the Q4, where each silicate is surrounded by four silicate or aluminate units. Thus in zeolites, there are five possibilities, described by Q4 (nAl, (4−n)Si), where n=0, 1, 2, 3, 4.

Generally these are noted as Si(nAl) or Si((4−n)Si), indicating that each silicon atom is linked via the oxygen, to n aluminum and 4−n silicon neighbors. Thus the silicon with four aluminum neighbors would be indicated by Si(4Al). When one or more Si atoms at the Q4 unit position are replaced by Al atoms, a shift in the $^{29}$Si chemical shift occurs.

In the case of the metalloaluminosilicate of the present invention, besides Al atoms there are other atoms incorporated into the structure of the material, so the shift in the chemical shifts are due to them, because for a material with a given silicon to aluminum molar ratio the shifts due to aluminum are fixed, so the modification in the $^{29}$Si NMR chemical shift is caused by the other element incorporated in the structure which is linked to the silicon through the oxygen atoms.

Mossbauer spectroscopy was used to confirm the incorporation of iron into the aluminosilicate framework of the ferrimetalloaluminosilicate material of Example 3 below. The Mossbauer spectra of this material showed a broad singlet at room temperature indicative of iron in a tetrahedral coordination with oxygen. X-ray photoelectron spectroscopy is a technique that has been used in the characterization of the incorporation of magnesium into the framework of magnesoaluminophosphates (Zeolites 15: 583–590, 1995). When the magnesium is coordinated tetrahedrally with four oxygens as in the case of the magnesoaluminophosphate the value of the binding energy for the Mg2p signal is about 50.1 eV. For Example 20 below, this technique was used and the value of the binding energy of the signal Mg 2p was 49.8 which is close to the value found for magnesium in the magnesoaluminophosphate.

The compositions of the present invention can be converted to protonic form, for example by ion exchange, with the help of a mineral acid, an ammonium compound, other proton suppliers, or with other cations. An important aspect of the invention is that the elements incorporated in the framework of the material are not ion-exchangeable, and therefore, they are not lost when ion exchange is done. The modified materials can be used in catalytic reactions as pure materials or in combination with other materials like clays, silicas, aluminas and other well known fillers.

Metalloaluminosilicates of the present invention have useful properties including catalytic activity. These novel compositions may be advantageously employed in known processes which presently use aluminosilicate zeolites. Aluminosilicate compositions of the present invention may be advantageously incorporated with binders, clays, aluminas, silicas, or other materials which are well-known in the art. They also can be modified with one or more elements or compounds by deposition, occlusion, ion-exchange or other techniques known to those skilled in the art to enhance, supplement or alter the properties or usefulness of the aluminosilicate compositions of the present invention. In accordance with a preferred embodiment, metalloaluminosilicates of the present invention can be used as additive in the FCC area and can be tailored to provide activity to specific end products and qualities.

The metalloaluminosilicate compositions of the present invention are prepared by hydrothermal methods so, the elements incorporated in the aluminosilicate compositions are not ion-exchangeable and form part of the structure of the crystalline aluminosilicate compositions.

In accordance with the present invention, a method is provided which is advantageous for preparing metalloaluminosilicate compositions, and which is also advantageous in preparing aluminosilicate compositions themselves.

In preparation of aluminosilicate compositions, a composition such as that identified as ST5 aluminosilicate (U.S. Pat. No. 5,254,327) can be prepared through sequentially mixing three solutions as described above.

In order to prepare an aluminosilicate composition, a first solution is prepared containing a silica source composition. A second solution is prepared containing an alumina source and a third aqueous acid solution is prepared. The silica source is then mixed with the aqueous acid solution so as to form a silica source-acid mixture, and the silica source-acid mixture is then preferably mixed with the alumina source solution so as to provide a gel mixture which can be hydrothermally crystallized so as to provide an aluminosilicate composition having an aluminosilicate framework. This composition is advantageously formed without the need for templating agents or seeding or other organic additives, and provides an aluminosilicate composition similar to ST5 which can advantageously be used for various catalytic applications. In this method, as with the method for preparing metalloaluminosilicates as discussed above, the sequence of first mixing silica source solution with acid or acid metal solution, followed by mixing with an alumina source solution to provide the desired gel mixture advantageously provides for formation of the desired aluminosilicate framework structure without the need for seeding or templating agents and, in the case of metalloaluminosilicates, advantageously incorporating the desired metal into the aluminosilicate framework.

In accordance with the present invention, it has been found that aluminosilicate compositions in accordance with the present invention are particularly useful in catalytic cracking processes. Aluminosilicate compositions in accordance with the present invention have been found to provide excellent improvement in yield of desirable products as compared to processes using conventional catalyst.

As described above, suitable metals for use in aluminosilicate compositions according to the present invention for providing desirable improvements in catalytic cracking processes include one or more metals selected from the group consisting of Groups IIA, IIIB, IVB, VB, VIB, VIIB, VIII, IB, IIB, IIIA, IVA, VA and combinations thereof (CAS version). Within this broad area of elements, and for use in catalytic cracking, elements which have been found to be particularly preferable include boron, magnesium, phosphorus, titanium, chromium, iron, cobalt, nickel, copper, zinc, gallium, zirconium and combinations thereof. Of these elements, boron, magnesium, phosphorus, titanium, chromium, iron, nickel, zinc and zirconium are preferred, and particularly preferred are phosphorus, iron, nickel and/or zinc, which have been found to provide excellent results in increasing LPG production while minimizing gasoline losses, and which also have been found to improve the quality of the LPG, for example by increasing the butene/butane ratio as well as the C3–C4 ratio. These particular metals have also been found to advantageously increase deep conversion.

Nickel and zinc have also been found to be particularly desirable in catalytic cracking processes and have demonstrated the unexpected capability to provide a final product including a gasoline fraction having a reduced sulfur content. Specifically, nickel and zinc-containing catalysts in the process of the present invention can provide for reductions in the range of 30–50% of the sulfur content of the gasoline.

In accordance with a further aspect of the present invention, catalysts containing nickel and zinc have been found to provide for a desirable increase in iso-olefin production in the final product.

In accordance with the present invention, the metalloaluminosilicate composition of the present invention may advantageously be used itself as a catalyst, or may be used as an additive to a conventional catalyst. Further, the catalytic cracking process of the present invention using the catalyst of the present invention may advantageously be a fluid catalytic cracking process, or a thermofor catalytic cracking process, or any other type of catalytic cracking process wherein the activity of the metalloaluminosilicate composition of the present invention is desirable.

In connection with fluid catalytic cracking processes, it may be desirable to provide the catalyst in the form of fluidizable microspheres for use in such a process. Alternatively, for thermofor processes, it may be desirable to provide the catalyst in bead or pellet form.

It is preferred that the catalyst be provided as an aggregate of catalyst microcrystals wherein the aggregates have a size between about 2 and about 10 microns, with the catalyst microparticles having an average particle size of between about 0.1 and about 1 microns.

The catalyst has also been found to advantageously be provided having zeolite as the aluminosilicate, preferably zeolite having a crystal size of greater than about 1 micron and up to and including about 12 microns.

As set forth above, in accordance with one preferred embodiment of the present invention, a metalloaluminosilicate composition in accordance with the present invention is used as an additive to a conventional catalyst. In this regard, the conventional catalyst may suitably be any type of conventional cracking catalyst or matrix, including, for example, silica, silica-alumina, alumina, clay and/or pillared clay. When used in this manner, it is preferred that the metalloaluminosilicate catalyst additive be added to conventional catalyst in an amount by weight of between about 0.10 and about 60% based upon total weight of the conventional catalyst. More preferably, the metalloaluminosilicate catalyst additive of the present invention is present in the conventional catalyst in an amount between about 0.1% and about 50% wt with respect to the conventional catalyst.

It is also preferred in accordance with the present invention that the metal be present within the framework of the aluminosilicate composition in an amount between about 0.01 and about 8% with respect to the weight of the metalloaluminosilicate composition.

In accordance with the process of the present invention, a suitable hydrocarbon fraction or feed to be treated is obtained, and a suitable catalyst according to the invention is selected. Although numerous types of hydrocarbon fractions can be treated, one particularly desirable feed for treatment in catalytic cracking is Vacuum Gas Oil (VGO), and a typical VGO has a composition as set forth in Table 3 below.

TABLE 3

| API gravity | 22.9 |
| Conradson carbon, wt. % | 0.05 |
| S, wt. % | 0.777 |
| N, ppm | 1396 |
| Basic nitrogen, ppm | 414 |
| Distillation range, °C. | 255–533 |
| F factor | 11.75 |

In accordance with the process of the present invention, the hydrocarbon fraction and catalyst are then contacted or exposed to each other under catalytic cracking conditions so as to provide an upgraded hydrocarbon product having enhanced or desired characteristics and qualities.

It is particularly advantageous that the process of the present invention can be utilized, along with selection of particular metals within the group of desired metals for incorporation into the metalloaluminosilicate, to tailor the final product to desired components and/or component quality. Examples of the process of the present invention will be presented below in Examples 21–27.

The new materials, their preparation methods and FCC processes using same will be further illustrated in the following examples.

The raw materials used in the examples are: commercial sodium silicate GLASSVEN (28.60 wt % $SiO_2$, 10.76 wt % $Na_2O$, 60.64 wt % $H_2O$), commercial sodium silicate VENESIL (28.88 wt % $SiO_2$, 8.85 wt % $Na_2O$, 62.27 wt % $H_2O$), Sulfuric acid from Fisher or Aldrich (98 wt %, d=1.836), Phosphoric acid from Aldrich (85 wt %), sodium aluminate LaPINE (49.1 wt % Al2O3, 27.2 wt % Na2O, 23.7 wt % H2O), the salts of the different elements to be incorporated are A.C.S reagent grade or Analytical grade from Aldrich.

Figure 2:
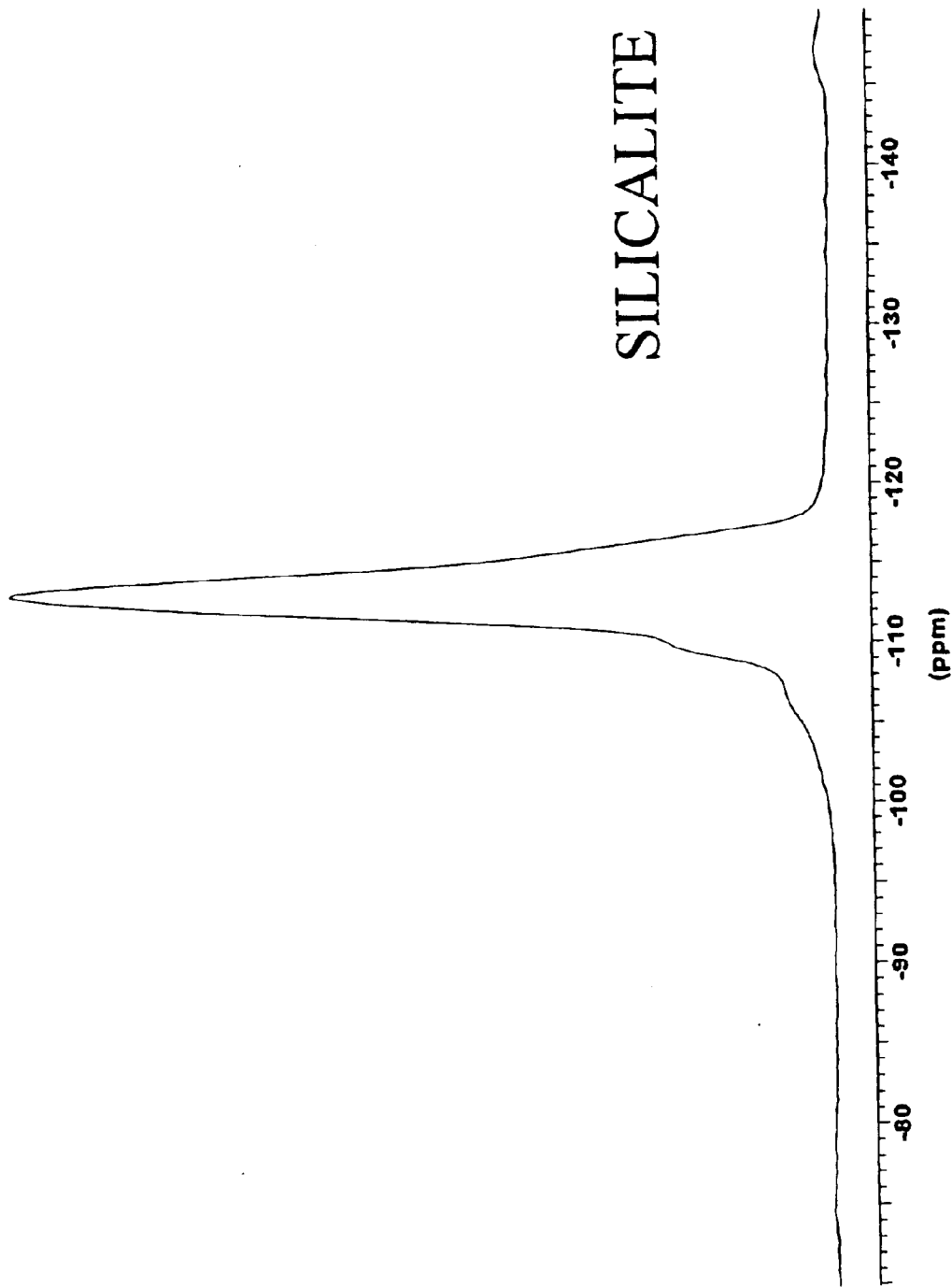
FIG. 2 is a $^{29}$Si NMR spectrum of a sample of silicalite. Silicalite is a silicate material with the MFI topology. In this material there is not aluminum or other element in the structure of the material, only silicon.
Figure 3:
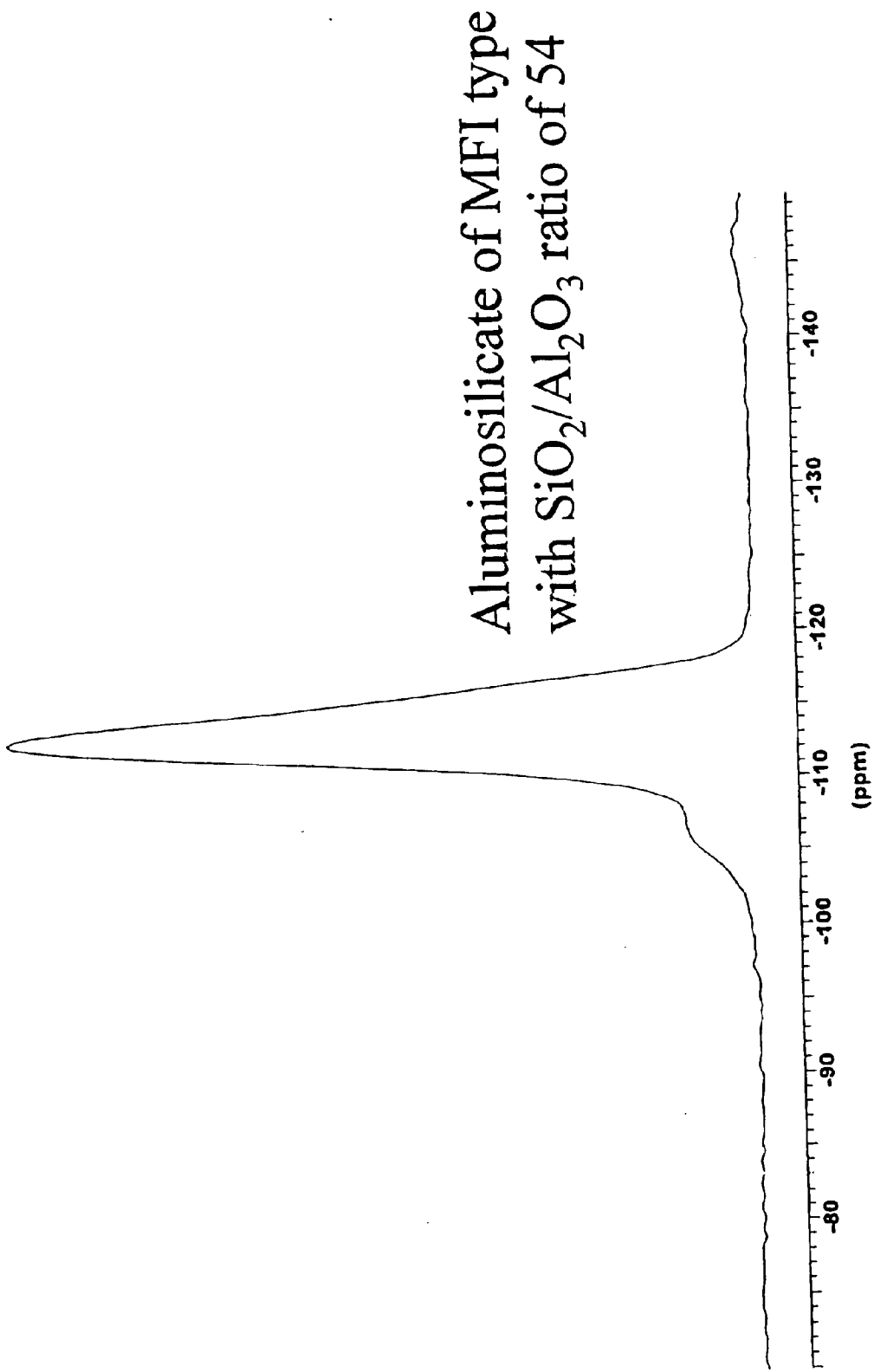
FIG. 3 is a $^{29}$Si NMR spectrum of a sample of an aluminosilicate material with the MFI topology. The silica to alumina molar ratio $SiO_2/Al_2O_3$ of this material is 54.
Figure 9:
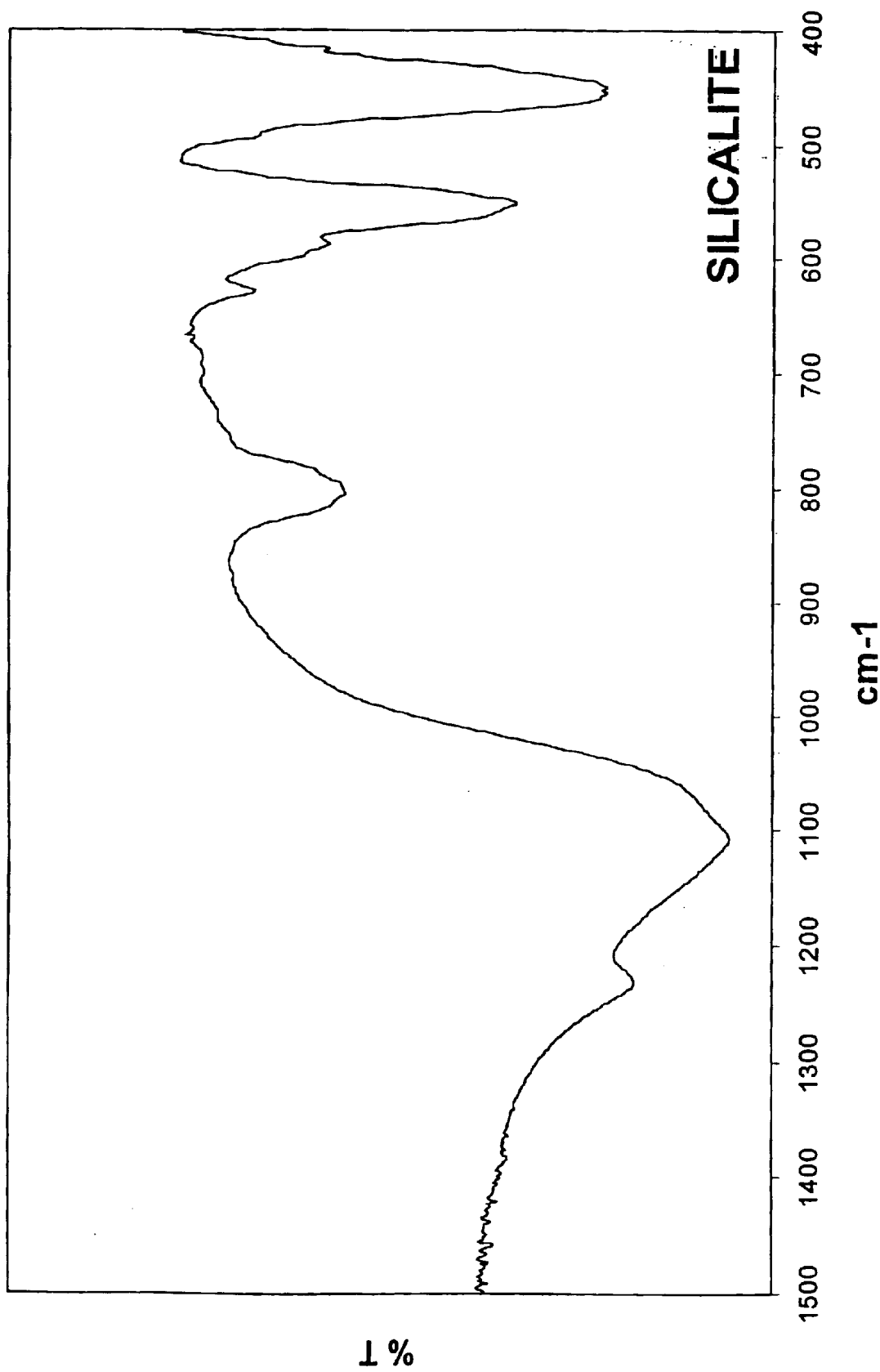
FIG. 9 is an infrared spectrum of the region 400–1500 $cm^{-1}$ of the silicalite sample.
Figure 10:
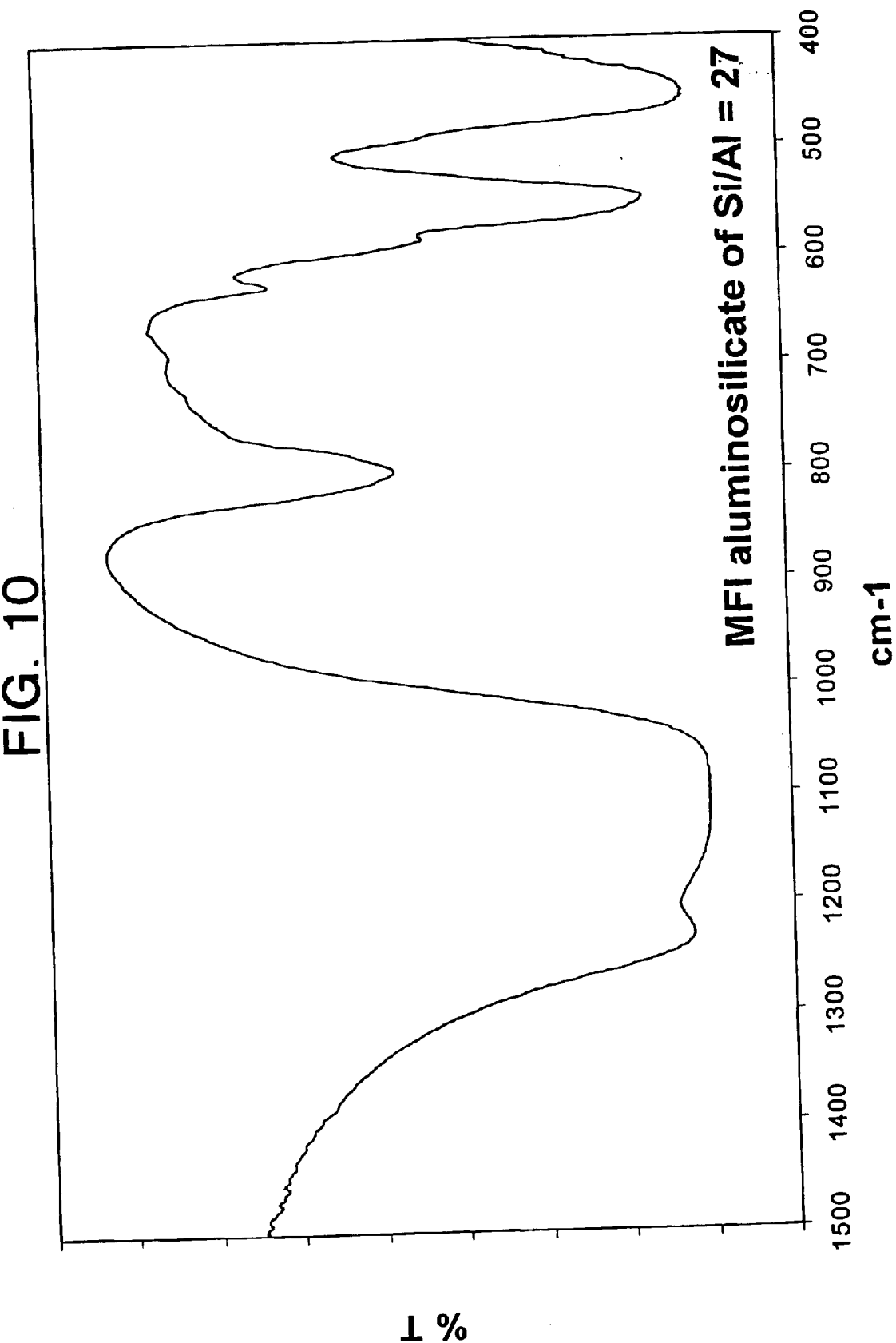
FIG. 10 is an infrared spectrum of the region 400–1500 $cm^{-1}$ of the MFI aluminosilicate material of $SiO_2/Al_2O_3$ ratio of 54.

The first two examples are to demonstrate the use of the method of the present invention for preparation of aluminosilicates of MFI topology without seeding or templates. The rest of the examples demonstrate the preparation and use of the metalloaluminosilicate of the present invention. In connection with the Examples, comparative reference may be had to FIGS. 2, 3, 9, and 10. FIGS. 2, and 9 are a $^{29}Si$ NMR spectrum and infrared spectrum (400–1500 cm$^{-1}$) respectively of silicalite, which has a structure of silicon only. FIGS. 3 and 10 are a $^{29}Si$ NMR spectrum (400–1500 cm$^{-1}$) of an aluminosilicate material.

EXAMPLE 1

Preparation of an aluminosilicate material of the ST5 type ($SiO_2/Al_2O_3$ ratio of 20) is illustrated. A reaction batch consisting of the following solutions was prepared according to the method of the present invention described above:

Sulfuric acid solution: 6.4 ml of $H_2SO_4$ concentrated and 40 ml of distilled water.

Sodium silicate solution: 85 g of sodium silicate and 38 ml of distilled water.

Sodium aluminate solution: 4.2 g of sodium aluminate and 20 ml of distilled water.

The gel composition in the form of molar ratios of oxides is given below:

| $SiO_2/Al_2O_3$ | $H_2O/SiO_2$ | $OH/SiO_2$ | $Na/SiO_2$ | $Na_2O/SiO_2$ |
|---|---|---|---|---|
| 20.18 | 20.67 | 0.10 | 0.68 | 0.34 |

The hydrothermal crystallization was carried out in a stirred 300-ml autoclave to a reaction temperature of 170° C. for a period of 48 hours. The dry material consisted of a pure aluminosilicate phase with an X-ray diffraction spectrum with at least the d values listed in Table 2, above. The chemical composition of the product, expressed in molar ratios, is: 1.1 $Na_2O:Al_2O_3:20.6$ $SiO_2:7$ $H_2O$. The white material obtained in this way is similar to the aluminosilicate ST5 (U.S. Pat. No. 5,254,327).

EXAMPLE 2

Preparation of an aluminosilicate material of the MFI type with a $SiO_2/Al_2O_3$ ratio of 50 is illustrated. A reaction batch consisting of the following solutions was prepared according to the invention described above:

Sulfuric acid solution: 6.1 ml of $H_2SO_4$ concentrated and 40 ml of distilled water.

Sodium silicate solution: 79 g of sodium silicate and 40 ml of distilled water.

Sodium aluminate solution: 1.5 g of sodium aluminate and 20 ml of distilled water.

The gel composition in the form of molar ratios of oxides is given below:

| $SiO_2/Al_2O_3$ | $H_2O/SiO_2$ | $OH/SiO_2$ | $Na/SiO_2$ | $Na_2O/SiO_2$ |
|---|---|---|---|---|
| 52.06 | 21.89 | 0.13 | 0.76 | 0.38 |

The hydrothermal crystallization was carried out in a stirred 300-ml autoclave to a reaction temperature of 170° C. for a period of 36 hours. The dry material consisted of a pure aluminosilicate phase with an X-ray diffraction spectrum with at least the d values listed in Table 2, above. The chemical composition of the product, expressed in molar ratios, is: 1.0 $Na_2O:Al_2O_3:50.2\ SiO_2:16\ H_2O$.

EXAMPLE 3

Preparation of a ferroaluminosilicate material of MFI type is illustrated. A reaction batch consisting of the following solutions was prepared according to the present invention:

Acid solution of iron (III) nitrate: 12 g of $Fe(NO_3)_3$, $9H_2O$, 38 ml of $H_2SO_4$ concentrate and 200 ml of distilled water.

Sodium silicate solution: 528 g of sodium silicate and 187 ml of distilled water.

Sodium aluminate solution: 23 g of sodium aluminate and 123 ml of distilled water.

The gel composition in the form of molar ratios of oxides is given below:

| $SiO_2/Al_2O_3$ | $H_2O/SiO_2$ | $OH/SiO_2$ | $Na/SiO_2$ | $Na_2O/SiO_2$ | $SiO_2/Fe_2O_3$ | Si/Fe |
|---|---|---|---|---|---|---|
| 22.69 | 20.67 | 0.13 | 0.81 | 0.40 | 169.16 | 84.58 |

The hydrothermal crystallization was carried out in a stirred 2-liter autoclave to a reaction temperature of 170° C. for a period of 54 hours. The dry material consisted of a pure ferroaluminosilicate phase with an X-ray diffraction spectrum with at least the d values listed in Table 2, above. The chemical composition of the white product, expressed in molar ratios, is: $1.21Na_2O:Al_2O_3:0.14Fe_2O_3:25.6SiO_2:10.2H_2O$. The Mossbauer spectrum of this material is shown in FIG. 1. This type of spectrum is typical of iron (III) in tetrahedral coordination.

EXAMPLE 4

Preparation of a ferrialuminosilicate material of the MFI type. A reaction batch consisting of the following solutions was prepared according with the procedure described above:

Acid solution of iron(III) nitrate: 7 g of $Fe(NO_3)_3 \cdot 9H_2O$, 6 ml of $H_2SO_4$ concentrate and 40 ml of distilled water.

Sodium silicate solution: 85 g of sodium silicate and 38 ml of distilled water.

Sodium aluminate solution: 1.7 g of sodium aluminate and 20 ml of distilled water.

The gel composition in the form of molar ratios of oxides is given below:

| $SiO_2/Al_2O_3$ | $H_2O/SiO_2$ | $OH/SiO_2$ | $Na/SiO_2$ | $Na_2O/SiO_2$ | $SiO_2/Fe_2O_3$ | Si/Fe |
|---|---|---|---|---|---|---|
| 49.42 | 20.58 | 0.18 | 0.89 | 0.445 | 46.68 | 23.34 |

Figure 4:
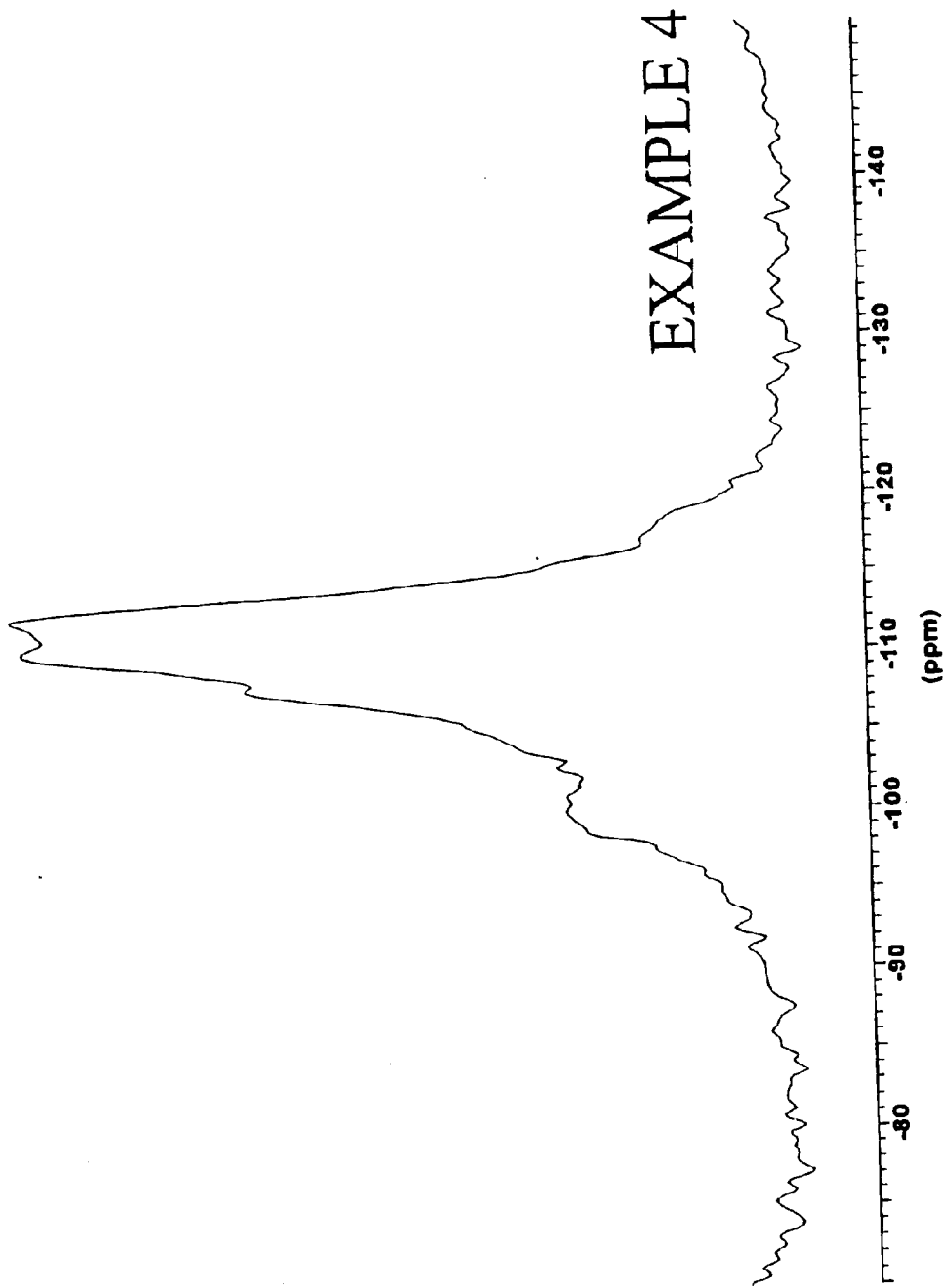
FIG. 4 is a $^{29}$Si NMR spectrum of the ferrialuminosilicate product of Example 4.

The hydrothermal crystallization was carried out in a stirred 300-ml autoclave to a reaction temperature of 170° C. for a period of 72 hours. The dry material consisted of a pure ferrialuminosilicate phase with an X-ray diffraction spectrum with at least the d values listed in Table 2, above. The chemical composition of the white product, expressed in molar ratios, is: $3.73Na_2O:Al_2O_3:1.59Fe_2O_3:74.4SiO_2:15.7H_2O$. The $^{29}Si$ NMR spectrum of this product is shown in FIG. 4. The $SiO_2/Al_2O_3$ molar ratio of this material is 74.4. It is clear that the iron is coordinated with the silicon and thus the spectrum is different from a simple silicate or aluminosilicate material of MFI topology.

Figure 11:
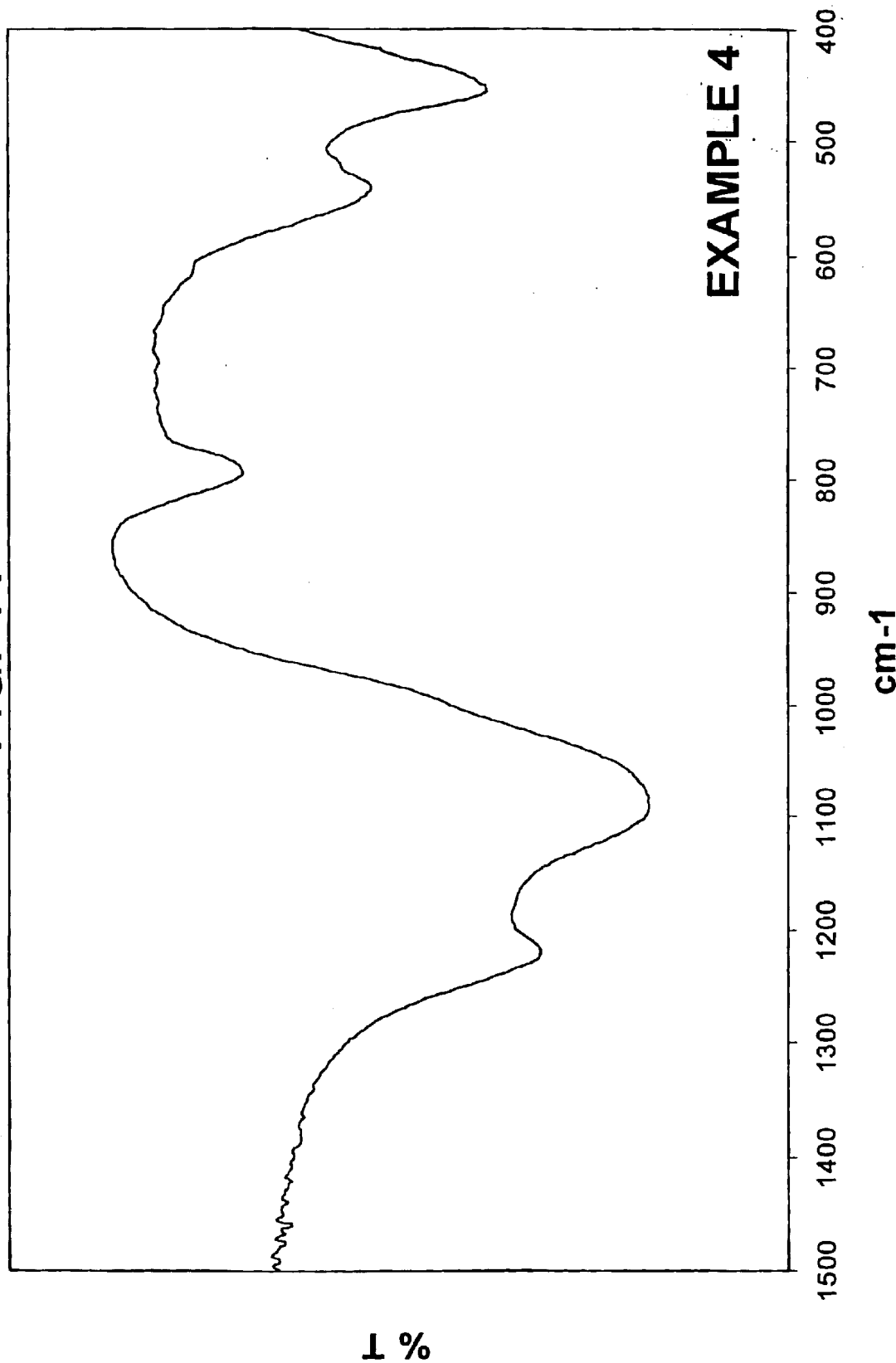
FIG. 11 is an infrared spectrum of the region 400–1500 $cm^{-1}$ of the ferrialuminosilicate product of Example 4.

The Infrared spectrum of this material is shown in FIG. 11. The $SiO_2/Al_2O_3$ molar ratio of this material is 74.4. It is clear that the iron is coordinated with the silicon and thus the spectrum is different from a simple silicate or aluminosilicate material of MFI topology.

Figure 20:
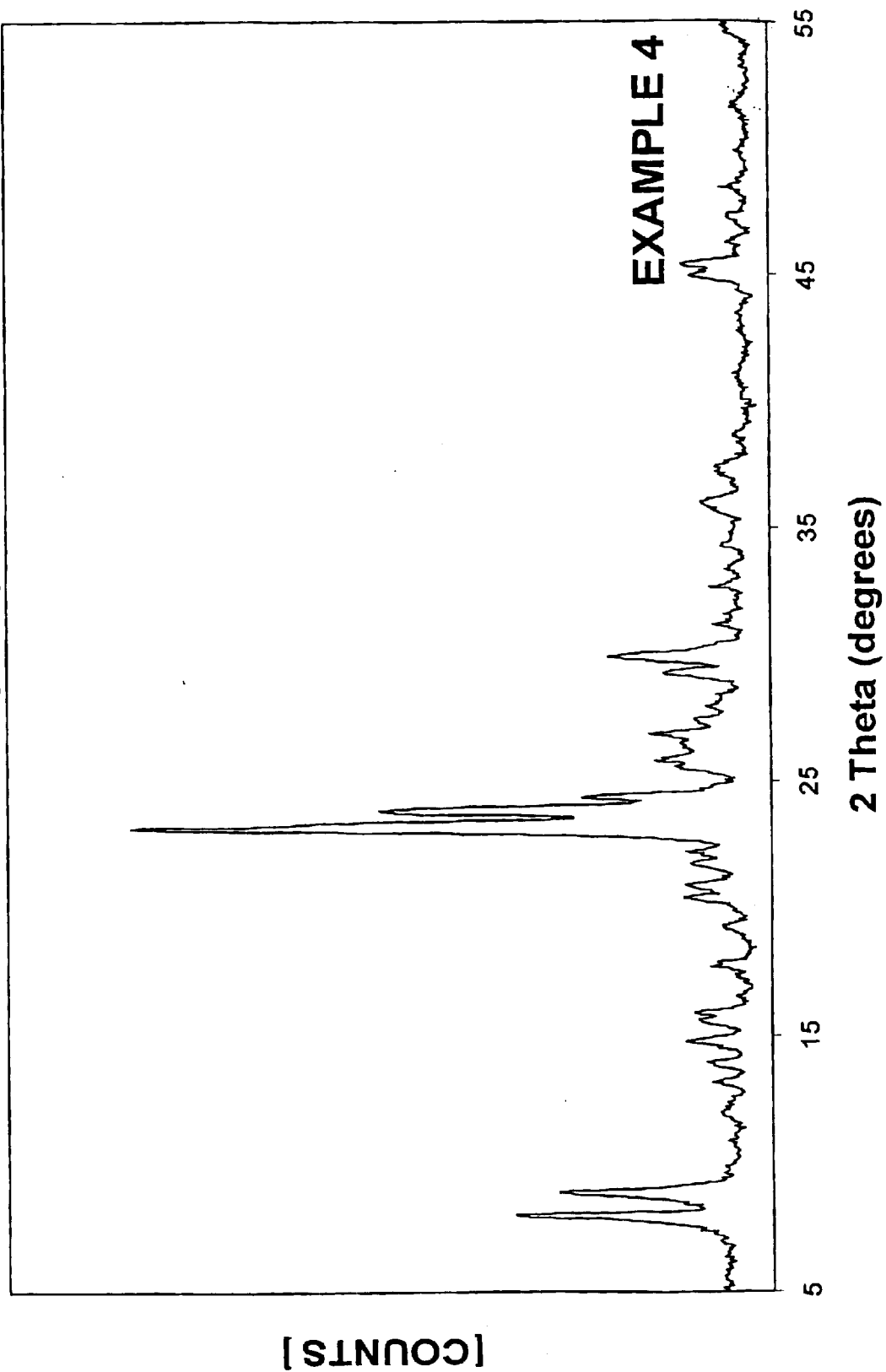
FIG. 20 is an X-ray diffraction diagram of the ferrialuminosilicate product of Example 4.

The X-ray diagram of this material is shown in FIG. 20.

EXAMPLE 5

Preparation of a ferrialuminosilicate material of the MFI type is illustrated. A reaction batch consisting of the following solutions was prepared according with the procedure described above:

Acid solution of iron(III) nitrate: 4 g of $Fe(NO_3)_3, 9H_2O$, 6 ml of $H_2SO_4$ concentrate and 40 ml of distilled water.

Sodium silicate solution: 85 g of sodium silicate and 38 ml of distilled water.

Sodium aluminate solution: 3.0 g of sodium aluminate and 20 ml of distilled water The gel composition in the form of molar ratios of oxides is given below:

| $SiO_2/Al_2O_3$ | $H_2O/SiO_2$ | $OH/SiO_2$ | $Na/SiO_2$ | $Na_2O/SiO_2$ | $SiO_2/Fe_2O_3$ | Si/Fe |
|---|---|---|---|---|---|---|
| 28.00 | 20.62 | 0.15 | 0.84 | 0.42 | 81.70 | 40.85 |

Figure 5:
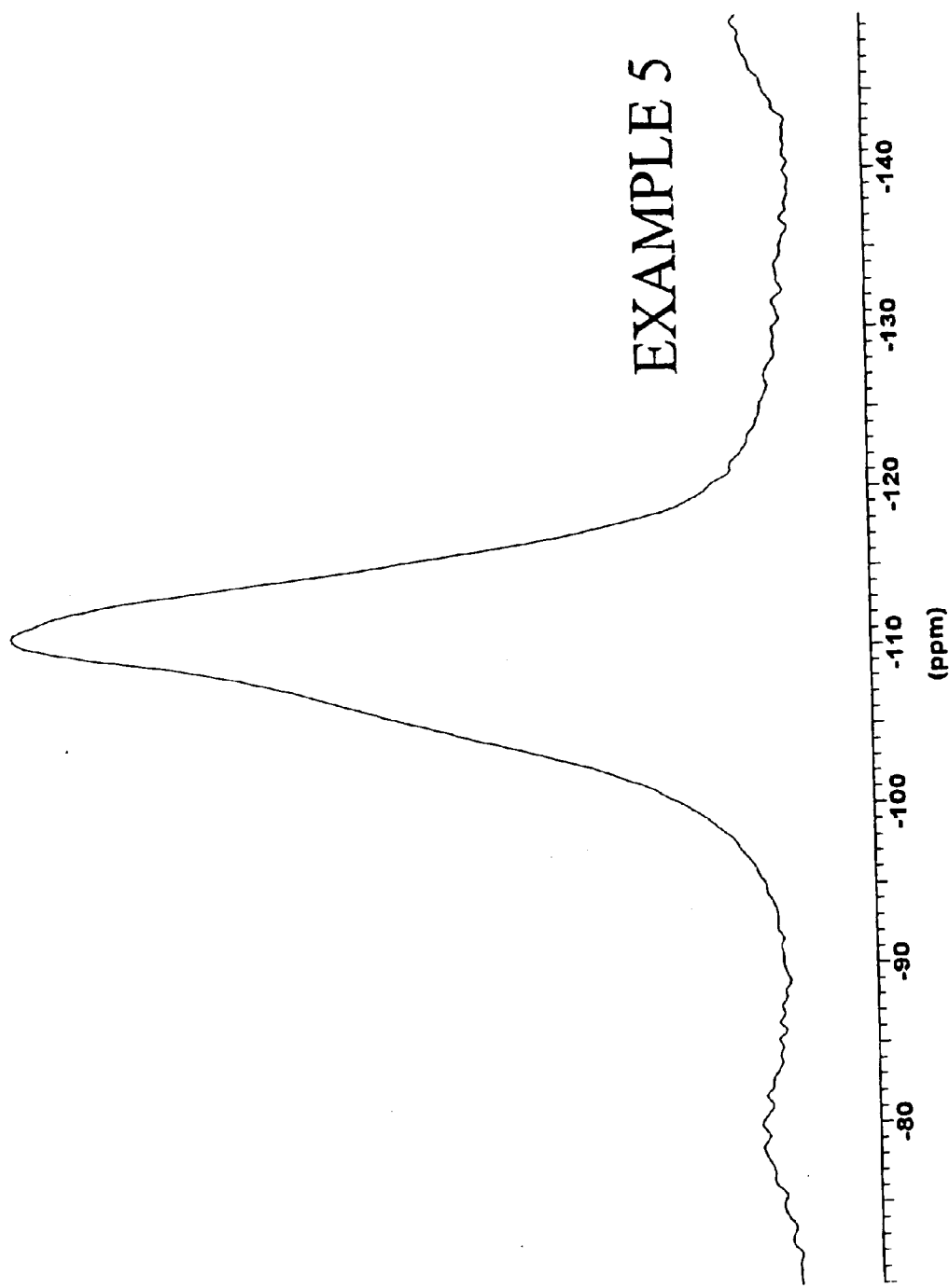
FIG. 5 is a $^{29}$Si NMR spectrum of the ferrialuminosilicate product of Example 5.

The hydrothermal crystallization was carried out in a stirred 300-ml autoclave to a reaction temperature of 170° C. for a period of 54 hours. The dry material consisted of a pure ferrialuminosilicate phase with an X-ray diffraction spectrum with at least the d values listed in Table 2, above. The chemical composition of the white product, expressed in molar ratios, is: $1.77Na_2O:Al_2O_3:0.35Fe_2O_3:28.7SiO_2:15.3H_2O$. The $^{29}Si$ NMR spectrum of this product is shown in FIG. 5. The $SiO_2/Al_2O_3$ molar ratio of this material is 28.7. It is clear that the iron is coordinated with the silicon and thus the spectrum is different from a simple silicate or aluminosilicate material of MFI topology.

Figure 12:
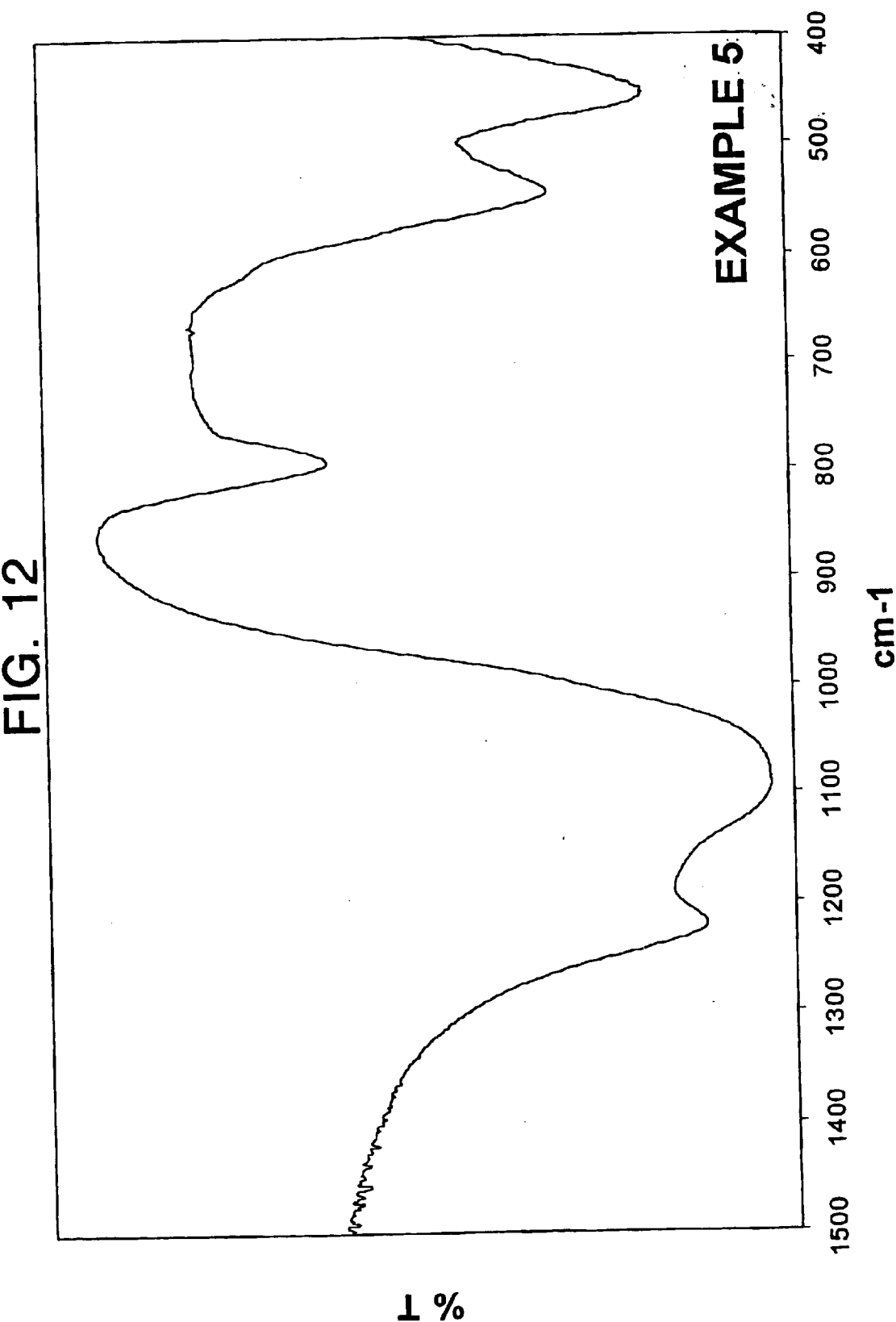
FIG. 12 is an infrared spectrum of the region 400–1500 $cm^{-1}$ of the ferrialuminosilicate product of Example 5.

The Infrared spectrum of this material is shown in FIG. 12. The $SiO_2/Al_2O_3$ molar ratio of this material is 28.66. It is clear that the iron is coordinated with the silicon and thus the spectrum is different from a simple silicate or aluminosilicate material of MFI topology.

EXAMPLE 6

Preparation of a zincoaluminosilicate material of the MFI type is illustrated. A reaction batch consisting of the following solutions was prepared according with the procedure described above:

Acid solution of zinc(II) nitrate: 1.2 g of $Zn(NO_3)_2 \cdot 6H_2O$, 6.1 ml of $H_2SO_4$ concentrate and 33 ml of distilled water.

Sodium silicate solution: 79.2 g of sodium silicate and 40 ml of distilled water.

Sodium aluminate solution: 3.9 g of sodium aluminate, 0.5 g of NaOH and 24 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/ZnO$ | Si/Zn |
|---|---|---|---|---|---|---|
| 20.07 | 21.50 | 0.14 | 0.85 | 0.43 | 93.43 | 93.43 |

The hydrothermal crystallization was carried out in a stirred 300-ml autoclave to a reaction temperature of 170° C. for a period of 36 hours. The dry material consisted of a pure zincoaluminosilicate phase with an X-ray diffraction spectrum with at least the d values listed in Table 2, above. The chemical composition of the white product, expressed in molar ratios, is: $1.13Na_2O:Al_2O_3:0.21ZnO:22.7SiO_2:6.7H_2O$.

EXAMPLE 7

Preparation of a zincoaluminosilicate material of the MFI type is illustrated. A reaction batch consisting of the following solutions was prepared according with the procedure described above:

Acid solution of zinc(II) nitrate: 3.0 g of $Zn(NO_3)_2 \cdot 6H_2O$, 6.0 ml of $H_2SO_4$ concentrate and 38 ml of distilled water.

Sodium silicate solution: 79.2 g of sodium silicate and 40 ml of distilled water.

Sodium aluminate solution: 2.5 g of sodium aluminate, 1.0 g of NaOH and 19 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/ZnO$ | Si/Zn |
|---|---|---|---|---|---|---|
| 31.31 | 21.44 | 0.15 | 0.85 | 0.43 | 37.37 | 37.37 |

Figure 13:
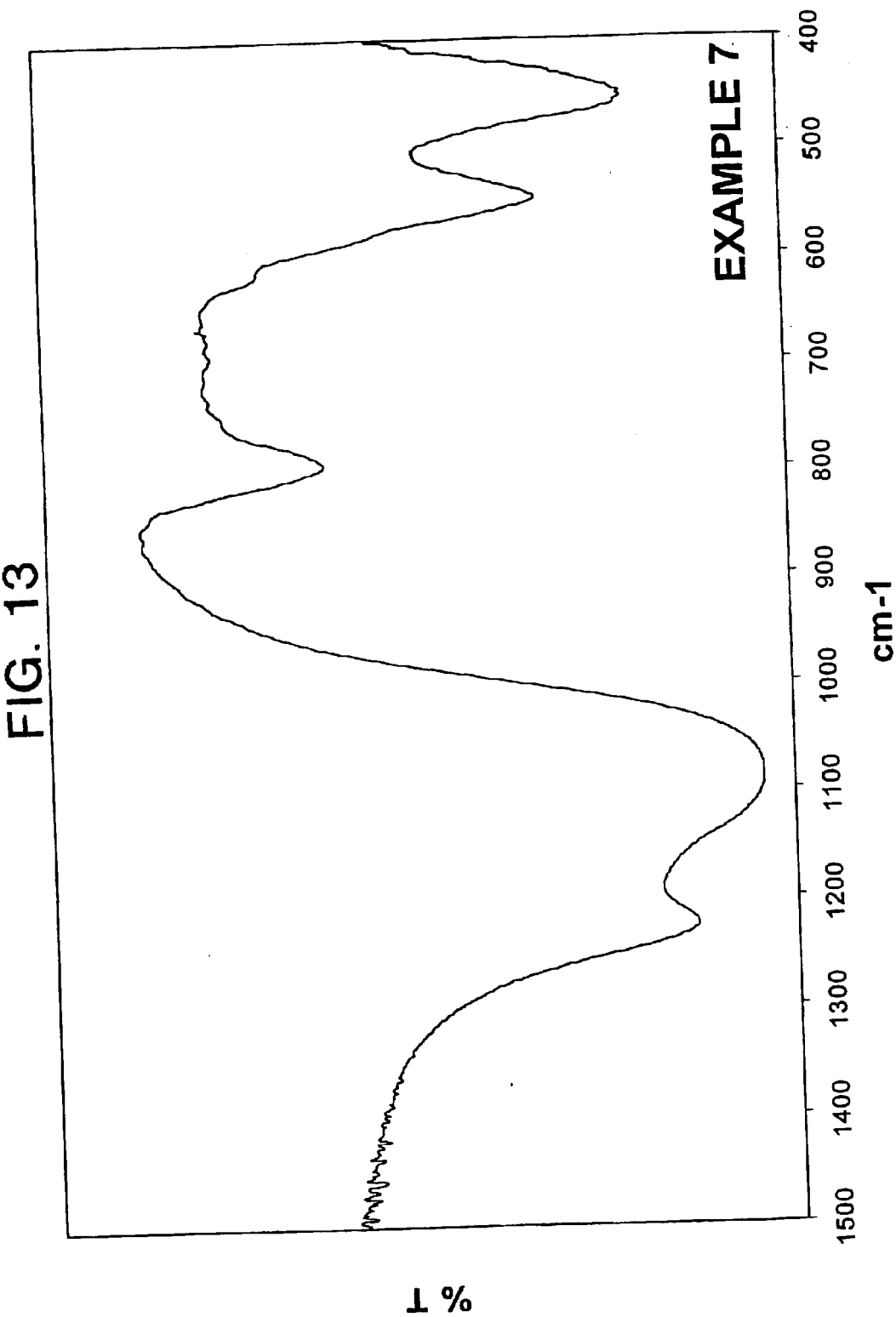
FIG. 13 is an infrared spectrum of the region 400–1500 $cm^{-1}$ of the zincoaluminosilicate product of Example 7.

The hydrothermal crystallization was carried out in a stirred 300-ml autoclave to a reaction temperature of 170° C. for a period of 72 hours. The dry material consisted of a pure zincoaluminosilicate phase with an X-ray diffraction spectrum with at least the d values listed in Table 2, above. The chemical composition of the white product, expressed in molar ratios, is: $1.40Na_2O:Al_2O_3:0.86ZnO:33.9SiO_2:21.4H_2O$. The Infrared spectrum of this material is shown in FIG. 13. The $SiO_2/Al_2O_3$ molar ratio of this material is 33.9. It is clear that the zinc is coordinated with the silicon and thus the spectrum is different from a simple silicate or aluminosilicate material of MFI topology.

Figure 21:
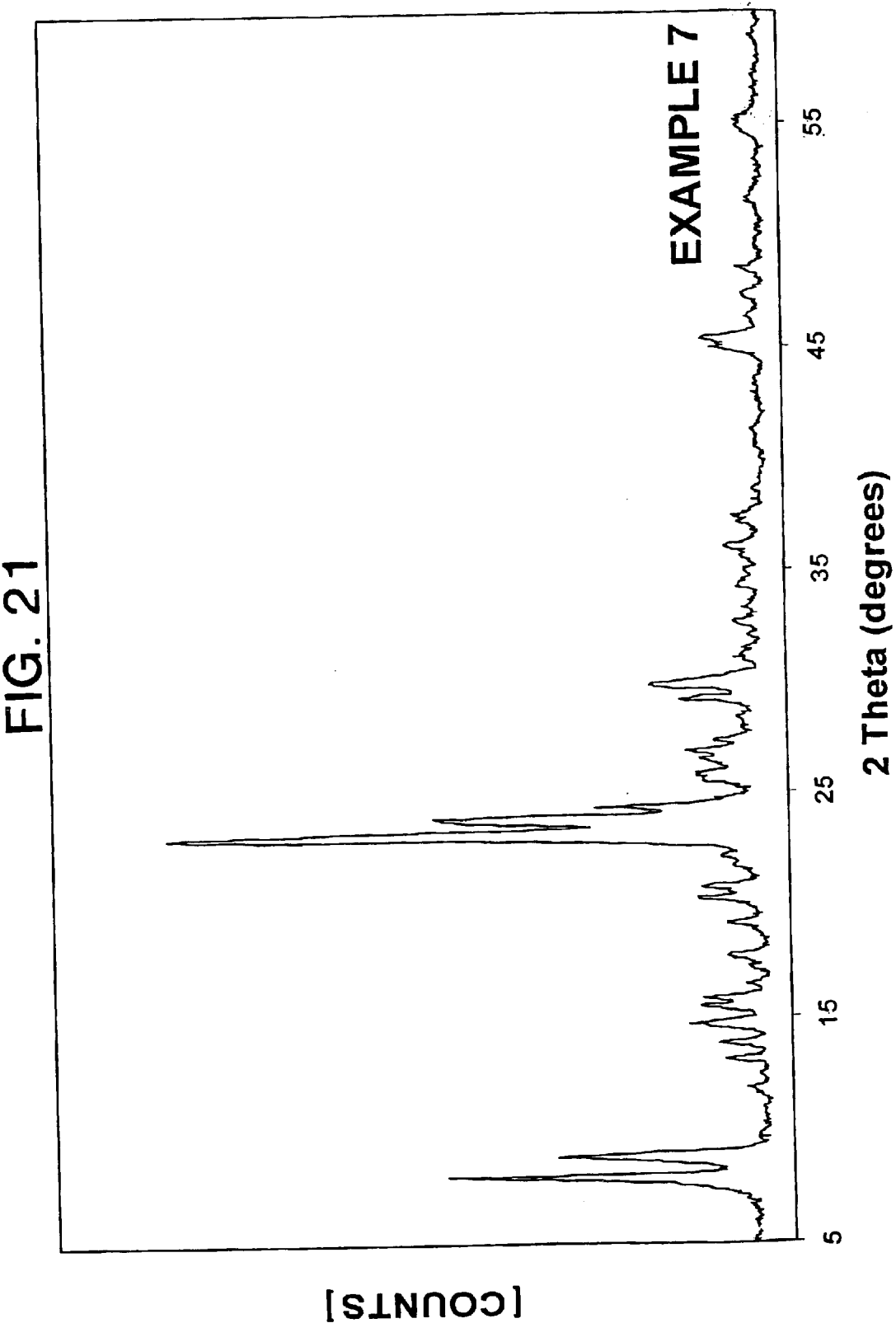
FIG. 21 is an X-ray diffraction diagram of the zincoaluminosilicate product of Example 7.

The X-ray diagram of this material is shown in FIG. 21.

EXAMPLE 8

Preparation of a zincoaluminosilicate material of the MFI type is illustrated. A reaction batch consisting of the following solutions was prepared according with the procedure described above:

Acid solution of zinc(II) nitrate: 3.0 g of $Zn(NO_3)_2 \cdot 6H_2O$, 6.0 ml of $H_2SO_4$ concentrate and 38 ml of distilled water.

Sodium silicate solution: 79.2 g of sodium silicate and 40 ml of distilled water.

Sodium aluminate solution: 1.6 g of sodium aluminate, 0.8 g of NaOH and 19 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/ZnO$ | Si/Zn |
|---|---|---|---|---|---|---|
| 48.93 | 21.41 | 0.14 | 0.82 | 0.40 | 37.38 | 37.38 |

Figure 6:
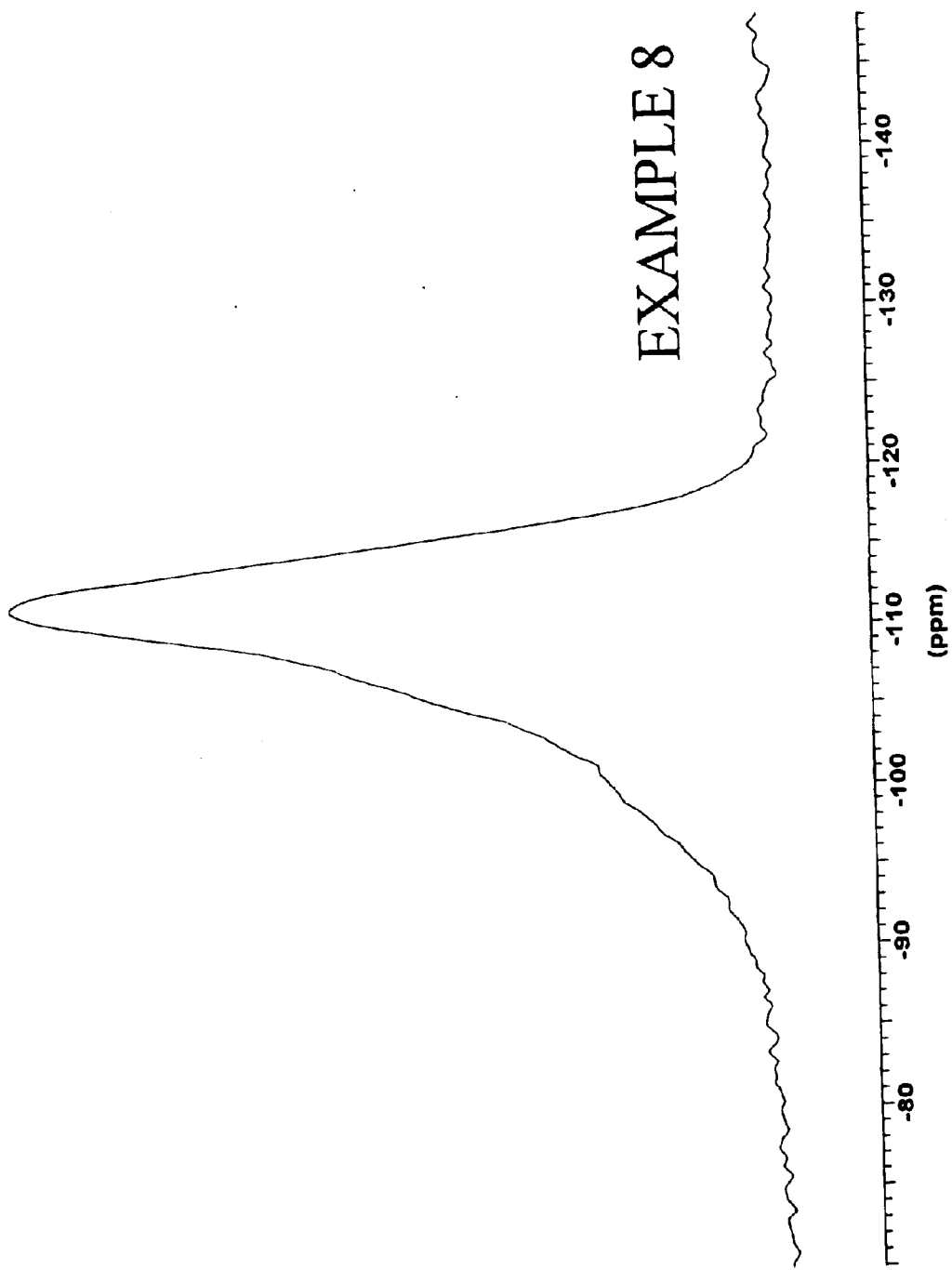
FIG. 6 is a $^{29}$Si NMR spectrum of the zincoaluminosilicate product of Example 8.

The hydrothermal crystallization was carried out in a stirred 300-ml autoclave to a reaction temperature of 170° C. for a period of 120 hours. The dry material consisted of a pure zincoaluminosilicate phase with an X-ray diffraction spectrum with at least the d values listed in Table 2, above. The chemical composition of the white product, expressed in molar ratios, is: $1.68Na_2O:Al_2O_3:1.37ZnO:52.9SiO_2:32.1H_2O$. The $^{29}Si$ NMR spectrum of this product is shown in FIG. 6. The $SiO_2/Al_2O_3$ molar ratio of this material is 52.9. It is clear that the zinc is coordinated with the silicon and thus the spectrum is different from a simple silicate or aluminosilicate material of MFI topology.

Figure 14:
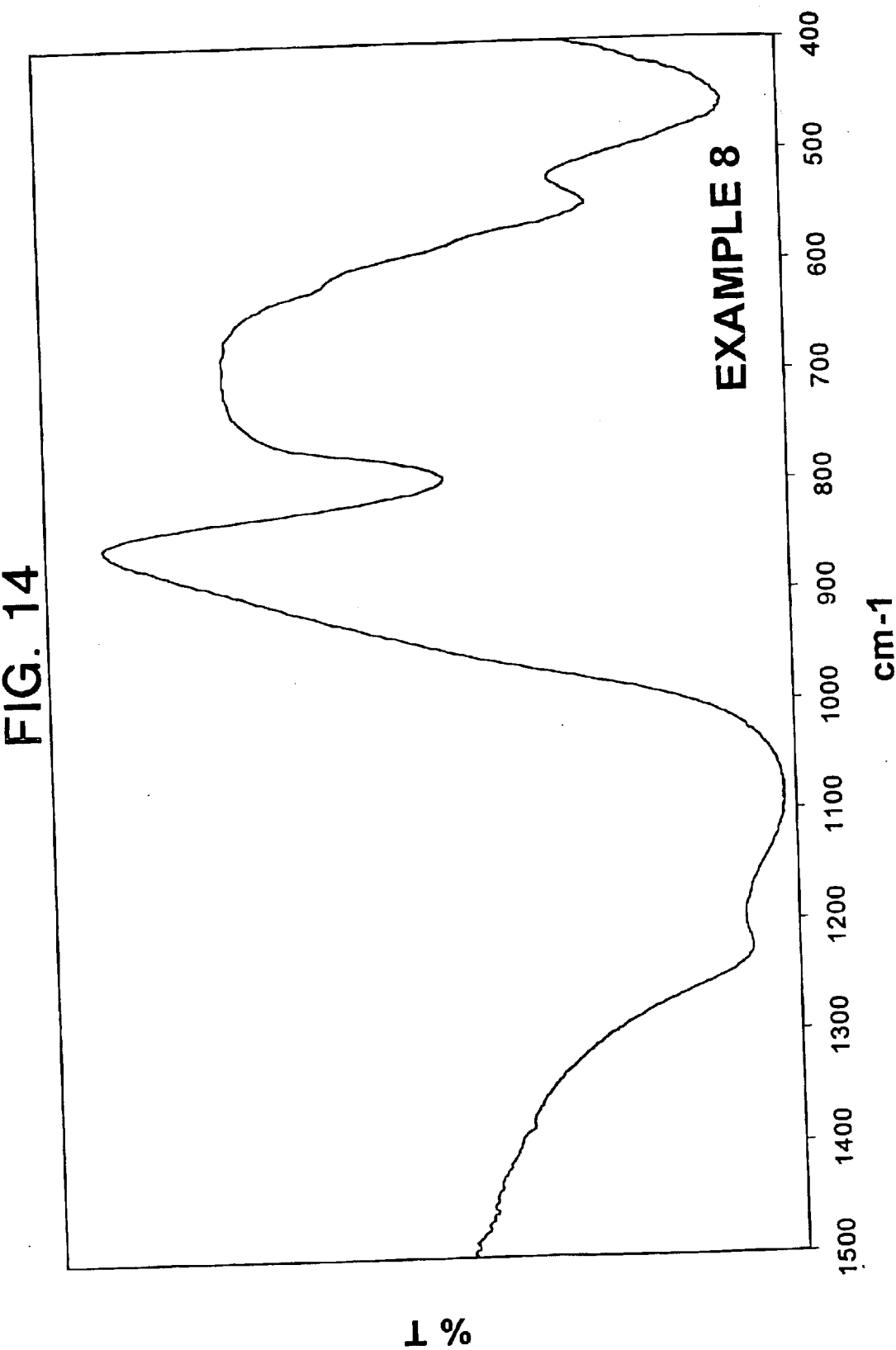
FIG. 14 is an infrared spectrum of the region 400–1500 $cm^{-1}$ of the zincoaluminosilicate product of Example 8.

The Infrared spectrum of this material is shown in FIG. 14. The $SiO_2/Al_2O_3$ molar ratio of this material is 52.9. It is clear that the zinc is coordinated with the silicon and thus the spectrum is different from a simple silicate or aluminosilicate material of MFI topology.

EXAMPLE 9

Preparation of a phosphoroaluminosilicate material of the MFI type is illustrated. A reaction batch consisting of the following solutions was prepared according with the procedure described above:

Acid solution of phosphoric acid: 0.82 g de $H_3PO_4$, 5.5 ml of $H_2SO_4$ concentrate and 40 ml of distilled water.

Sodium silicate solution: 79.2 g of sodium silicate and 33 ml of distilled water.

Sodium aluminate solution: 3.9 g of sodium aluminate and 19 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/P_2O_5$ | Si/P |
|---|---|---|---|---|---|---|
| 20.60 | 21.76 | 0.13 | 0.82 | 0.41 | 105.97 | 52.98 |

Figure 22:
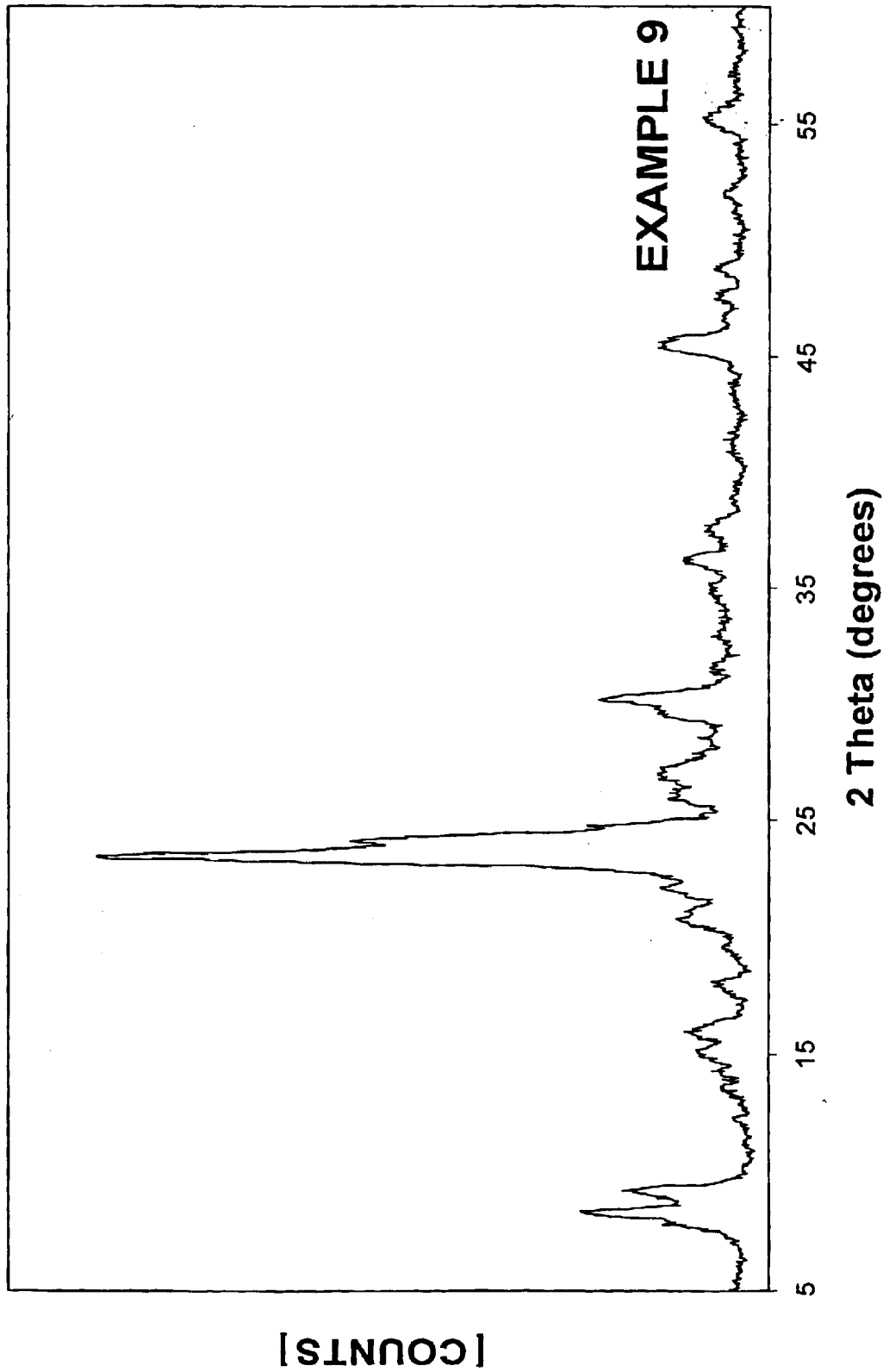
FIG. 22 is an X-ray diffraction diagram of the phosphoroaluminosilicate product of Example 9.

The hydrothermal crystallization was carried out in a stirred 300-ml autoclave to a reaction temperature of 170° C.

for a period of 72 hours. The dry material consisted of a pure phosphoroaluminosilicate phase with an X-ray diffraction spectrum with at least the d values listed in Table 2, above. The chemical composition of the white product, expressed in molar ratios, is: $1.07Na_2O:Al_2O_3:0.25P_2O_5:24.3SiO_2:3.3H_2O$. The X-ray diagram of this material is shown in FIG. 22.

EXAMPLE 10

Preparation of a nickelaluminosilicate material of the MFI type is illustrated. A reaction batch consisting of the following solutions was prepared according with the procedure described above:

Acid solution of nickel (II) nitrate: 180 g of $Ni(NO_3)_2 \cdot 6H_2O$, 1000 ml of $H_2SO_4$ concentrate and 6000 ml of distilled water.

Sodium silicate solution: 14400 g of sodium silicate and 6000 ml of distilled water.

Sodium aluminate solution: 695 g sodium aluminate and 4800 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/NiO$ | $Si/Ni$ |
|---|---|---|---|---|---|---|
| 20.66 | 20.82 | 0.06 | 0.68 | 0.34 | 111.70 | 111.70 |

Figure 23:
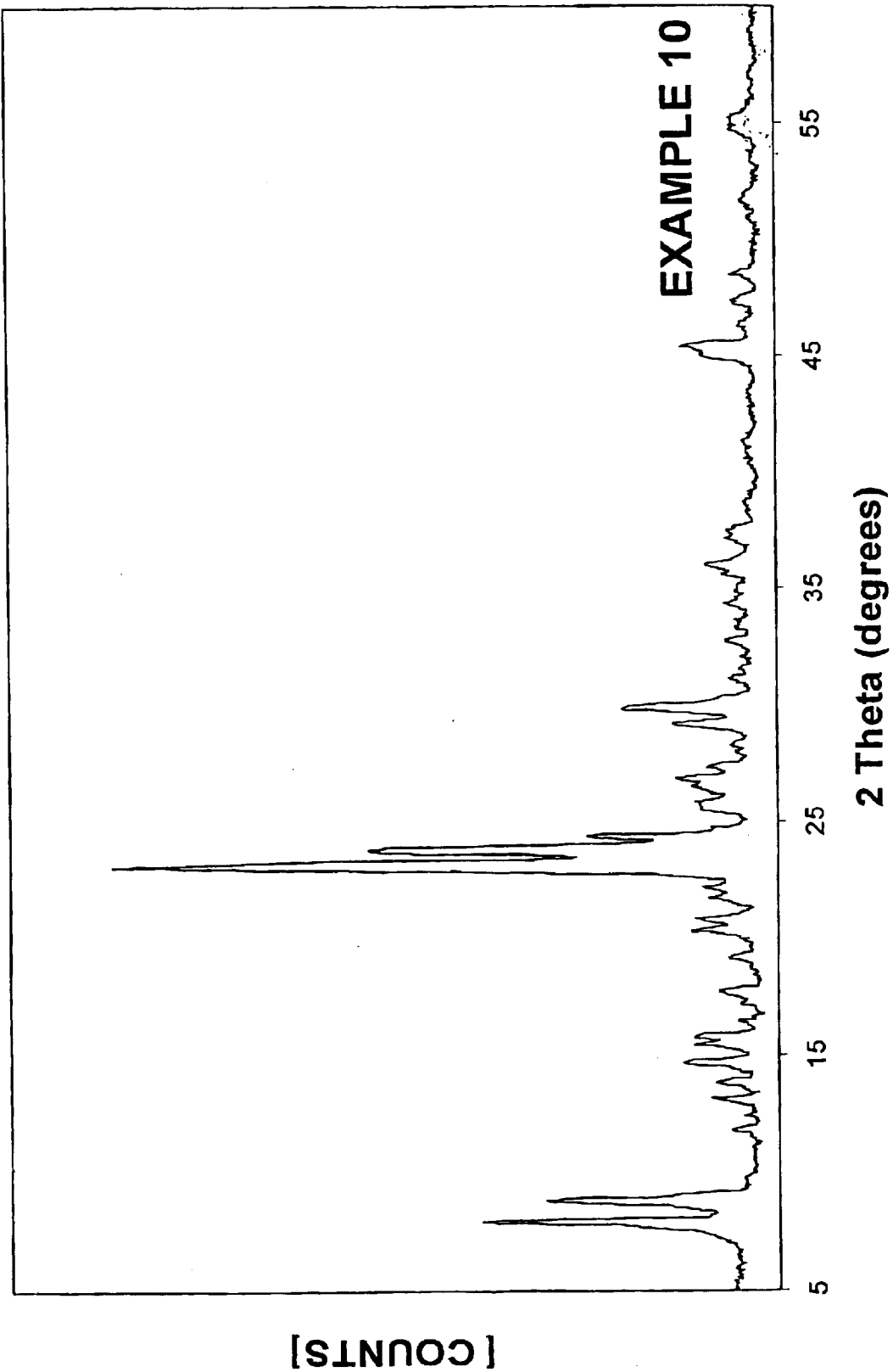
FIG. 23 is an X-ray diffraction diagram of the nickelaluminosilicate product of Example 10.

The hydrothermal crystallization was carried out in a stirred 40-liter autoclave to a reaction temperature of 170° C. for a period of 54 hours. The dry material consisted of a pure nickelaluminosilicate phase with an X-ray diffraction spectrum with at least the d values listed in Table 2, above. The chemical composition of the white to pale-green product, expressed in molar ratios, is: $1.03Na_2O:Al_2O_3:0.18NiO:23.5SiO_2:9.2H_2O$. The X-ray diagram of this material is shown in FIG. 23.

EXAMPLE 11

Preparation of a nickelaluminosilicate material of the MFI type is illustrated. A reaction batch consisting of the following solutions was prepared according with the procedure described above:

Acid solution of nickel (II) nitrate: 16 g of $Ni(NO_3)_2 \cdot 6H_2O$, 36 ml of $H_2SO_4$ concentrate and 240 ml of distilled water.

Sodium silicate solution: 576 g of sodium silicate and 240 ml of distilled water.

Sodium aluminate solution: 27.8 g sodium aluminate and 192 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/NiO$ | $Si/Ni$ |
|---|---|---|---|---|---|---|
| 20.66 | 20.82 | 0.11 | 0.68 | 0.34 | 50.26 | 50.26 |

The hydrothermal crystallization was carried out in a stirred 40-liter autoclave to a reaction temperature of 170° C. for a period of 54 hours. The dry material consisted of a pure nickelaluminosilicate phase with an X-ray diffraction spectrum with at least the d values listed in Table 2, above. The chemical composition of the white to pale-green product, expressed in molar ratios, is: $1.24Na_2O:Al_2O_3:0.43NiO:23.2SiO_2:10.1H_2O$.

EXAMPLE 12

Preparation of a nickelaluminosilicate material of the MFI type is illustrated. A reaction batch consisting of the following solutions was prepared according with the procedure described above:

Acid solution of nickel (II) nitrate: 3.6 g of $Ni(NO_3)_2 \cdot 6H_2O$, 6 ml of $H_2SO_4$ concentrate and 40 ml of distilled water.

Sodium silicate solution: 85 g of sodium silicate and 38 ml of distilled water.

Sodium aluminate solution: 2.0 g sodium aluminate, 0.4 g of NaOH and 20 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/NiO$ | $Si/Ni$ |
|---|---|---|---|---|---|---|
| 42.00 | 20.58 | 0.17 | 0.80 | 0.40 | 32.68 | 32.68 |

Figure 15:
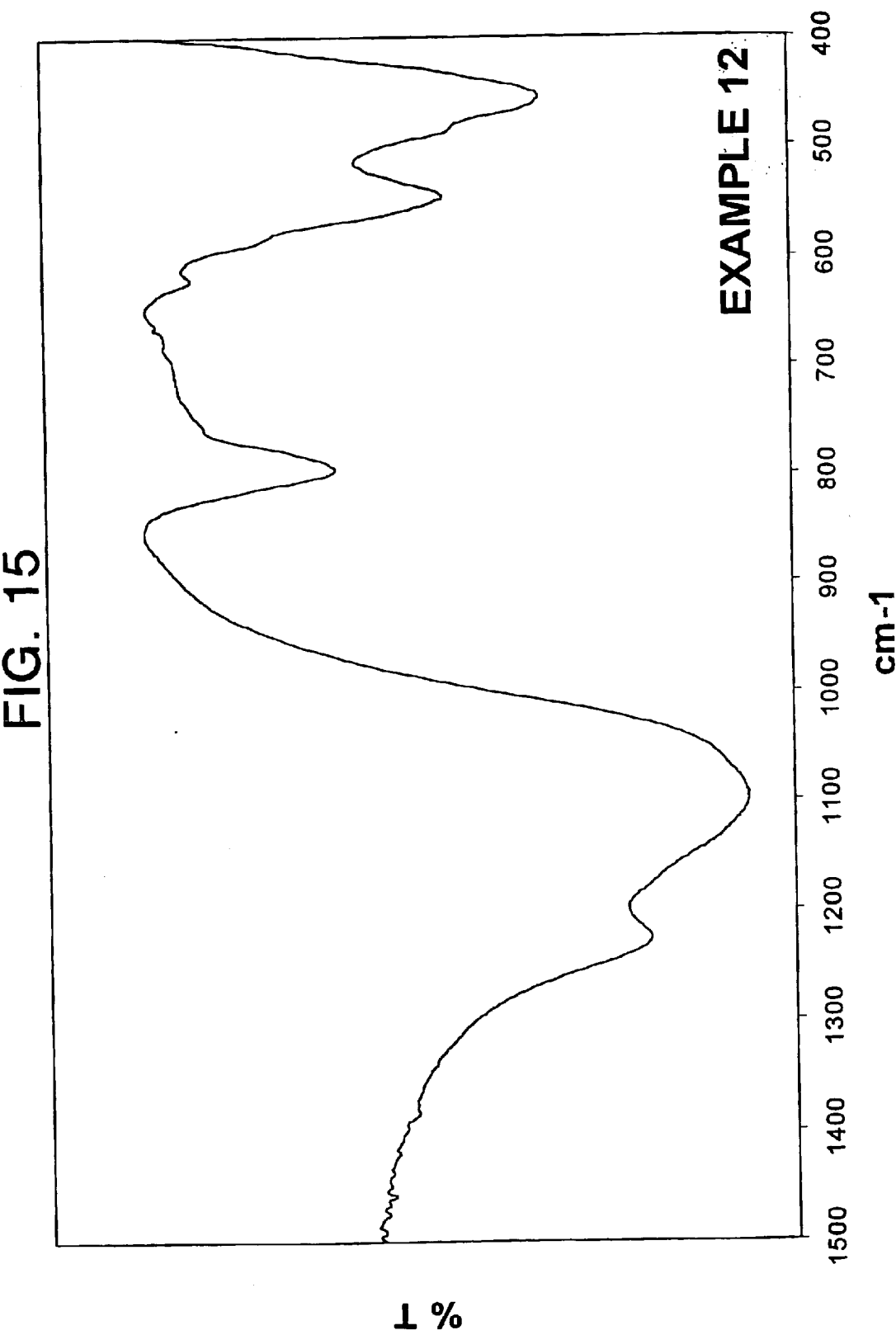
FIG. 15 is an infrared spectrum of the region 400–1500 $cm^{-1}$ of the nickelaluminosilicate product of Example 12.

The hydrothermal crystallization was carried out in a stirred 300-ml autoclave to a reaction temperature of 170° C. for a period of 84 hours. The dry material consisted of a pure nickelaluminosilicate phase with an X-ray diffraction spectrum with at least the d values listed in Table 2, above. The chemical composition of the white to pale-green product, expressed in molar ratios, is: $1.66Na_2O:Al_2O_3:1.59NiO:53.7SiO_2:38.6H_2O$. The Infrared spectrum of this material is shown in FIG. 15. The $SiO_2/Al_2O_3$ molar ratio of this material is 53.7. It is clear that the nickel is coordinated with the silicon and thus the spectrum is different from a simple silicate or aluminosilicate material of MFI topology.

EXAMPLE 13

Preparation of a cobaltoaluminosilicate material of the MFI type is illustrated. A reaction batch consisting of the following solutions was prepared according with the procedure described above:

Acid solution of cobalt (II) nitrate: 1.2 g of $Co(NO_3)_2 \cdot 6H_2O$, 6.1 ml of $H_2SO_4$ concentrate and 40 ml of distilled water.

Sodium silicate solution: 79.2 g of sodium silicate and 33 ml of distilled water.

Sodium aluminate solution: 3.8 g of sodium aluminate and 19 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/CoO$ | $Si/Co$ |
|---|---|---|---|---|---|---|
| 22.60 | 20.76 | 0.12 | 0.82 | 0.41 | 113.07 | 113.07 |

Figure 24:
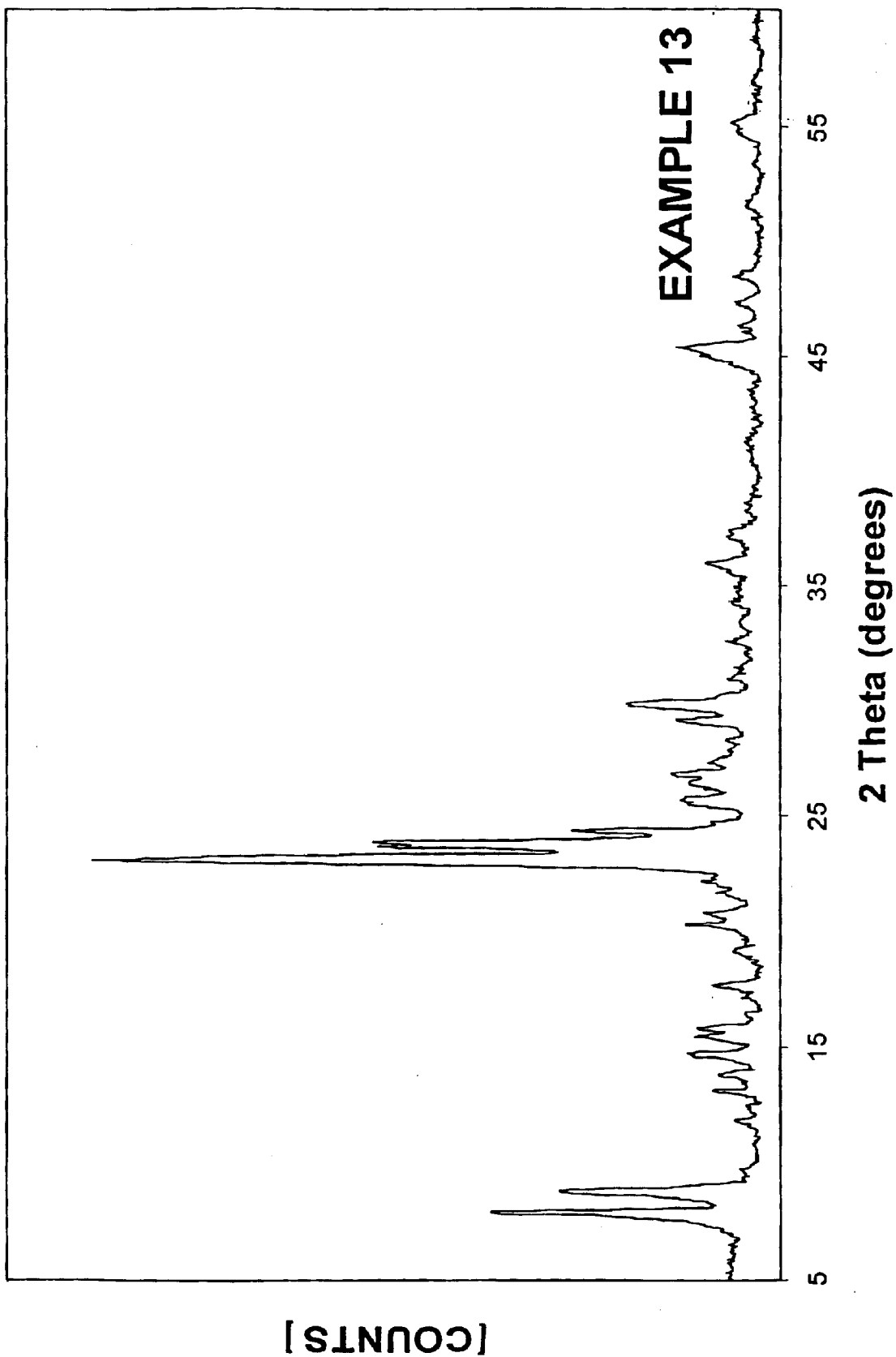
FIG. 24 is an X-ray diffraction diagram of the cobaltoaluminosilicate product of Example 13.

The hydrothermal crystallization was carried out in a stirred 300-ml autoclave to a reaction temperature of 170° C. for a period of 54 hours. The dry material consisted of a pure cobaltoaluminosilicate phase with an X-ray diffraction spectrum with at least the d values listed in Table 2, above. The chemical composition of the white to pale-pink product, expressed in molar ratios, is: $1.15Na_2O:Al_2O_3:0.21CoO:27.6SiO_2:15.4H_2O$. The X-ray diagram of this material is shown in FIG. 24.

EXAMPLE 14

Preparation of a zirconoaluminosilicate material of the MFI type is illustrated. A reaction batch consisting of the following solutions was prepared according with the procedure described above:

Acid solution of Zirconyl chloride: 1.2 g of $ZrOCl_2 \cdot 8H_2O$, 6 ml of $H_2SO_4$ concentrate and 40 ml of distilled water.

Sodium silicate solution: 79.4 g of sodium silicate and 33 ml of distilled water.

Sodium aluminate solution: 3.8 g of sodium aluminate and 19 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/ZrO_2$ | $Si/Zr$ |
|---|---|---|---|---|---|---|
| 20.65 | 20.72 | 0.12 | 0.82 | 0.41 | 101.49 | 101.49 |

The hydrothermal crystallization was carried out in a stirred 300-ml autoclave to a reaction temperature of 170° C. for a period of 96 hours. The dry material consisted of a pure zirconoaluminosilicate phase with an X-ray diffraction spectrum with at least the d values listed in Table 2, above. The chemical composition of the white product, expressed in molar ratios, is: $1.32Na_2O:Al_2O_3:0.26ZrO_2:23.9SiO_2:17.2H_2O$.

EXAMPLE 15

Preparation of a galloaluminosilicate material of the MFI type is illustrated. A reaction batch consisting of the following solutions was prepared according with the procedure described above:

Acid suspension of gallium (III) oxide: 2 g of $Ga_2O_3$, 6.5 ml of $H_2SO_4$ concentrate and 40 ml of distilled water.

Sodium silicate solution: 85 g of sodium silicate and 38 ml of distilled water.

Sodium aluminate solution: 1.5 g of sodium aluminate, 0.2 g de NaOH and 20 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/Ga_2O_3$ | $Si/Ga$ |
|---|---|---|---|---|---|---|
| 56.01 | 20.57 | 0.149 | 0.77 | 0.39 | 37.91 | 18.96 |

Figure 7:
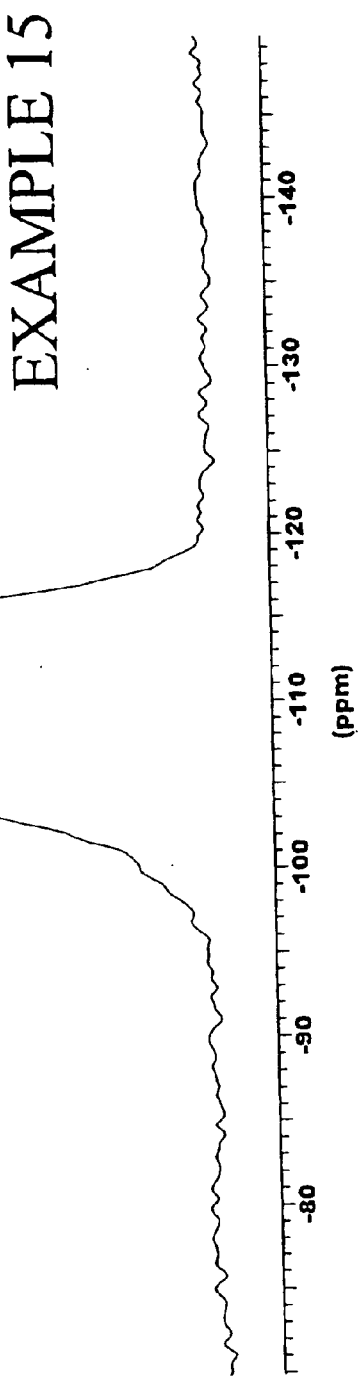
FIG. 7 is a $^{29}$Si NMR spectrum of the galloaluminosilicate product of Example 15.

The hydrothermal crystallization was carried out in a stirred 300-ml autoclave to a reaction temperature of 170° C. for a period of 72 hours. The dry material consisted of a pure galloaluminosilicate phase with an X-ray diffraction spectrum with at least the d values listed in Table 2, above. The chemical composition of the white product, expressed in molar ratios, is: $3.11Na_2O:Al_2O_3:1.77Ga_2O_3:81.1SiO_2:55.4H_2O$. The $^{29}Si$ NMR spectrum of this product is shown in FIG. 7. The $SiO_2/Al_2O_3$ molar ratio of this material is 81.1. It is clear that the gallium is coordinated with the silicon and thus the spectrum is different from a simple silicate or aluminosilicate material of MFI topology.

Figure 16:
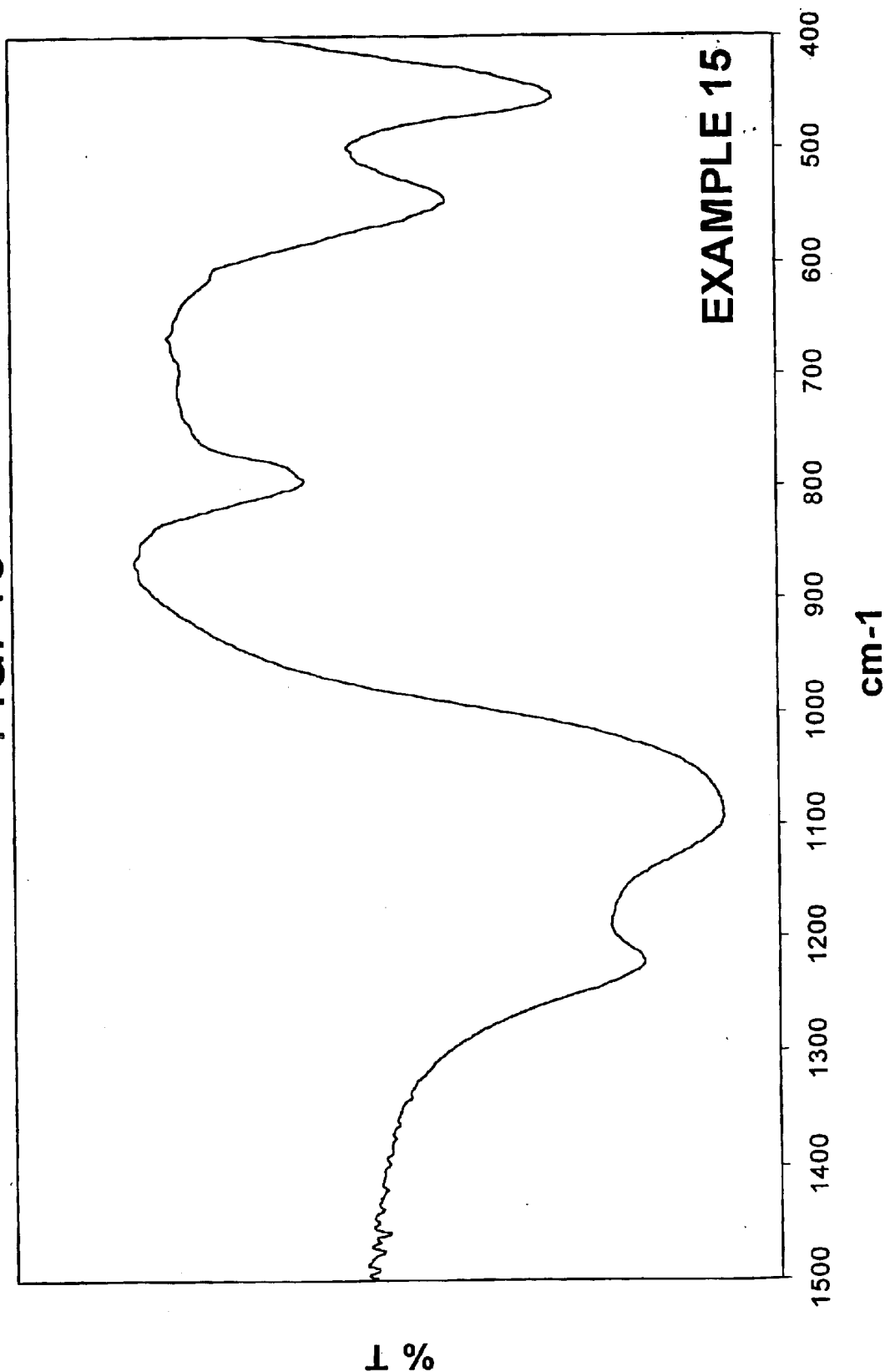
FIG. 16 is an infrared spectrum of the region 400–1500 $cm^{-1}$ of the galloaluminosilicate product of Example 15.
Figure 25:
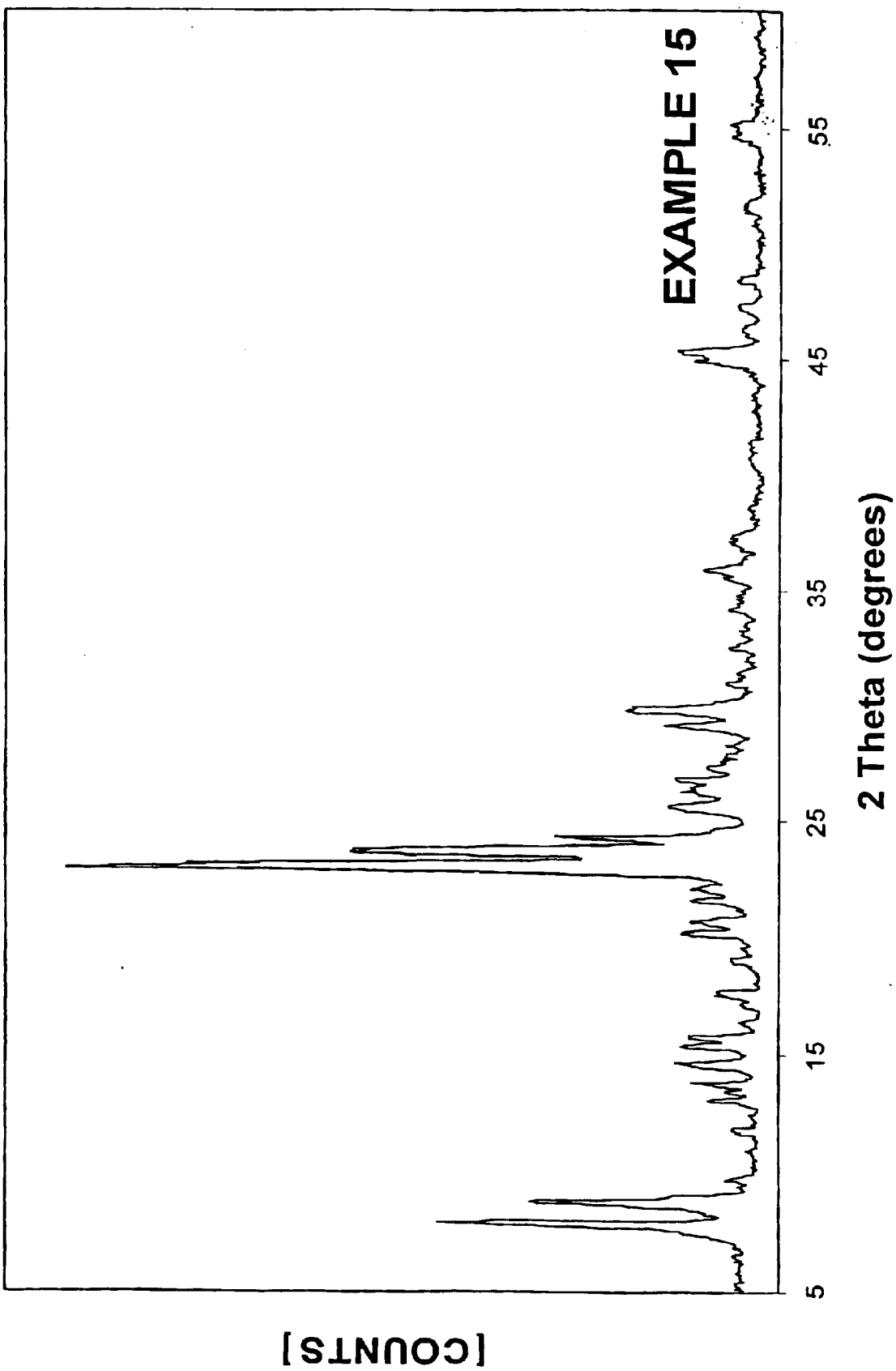
FIG. 25 is an X-ray diffraction diagram of the galloaluminosilicate product of Example 15.

The Infrared spectrum of this material is shown in FIG. 16. The $SiO_2/Al_2O_3$ molar ratio of this material is 81.1. It is clear that the gallium is coordinated with the silicon and thus the spectrum is different from a simple silicate or aluminosilicate material of MFI topology. The X-ray diagram of this material is shown in FIG. 25.

EXAMPLE 16

Preparation of a galloaluminosilicate material of the MFI type is illustrated. A reaction batch consisting of the following solutions was prepared according with the procedure described above:

Acid suspension of gallium (III) oxide: 2.8 g of $Ga_2O_3$, 6.5 ml of $H_2SO_4$ concentrate and 40 ml of distilled water.

Sodium silicate solution: 85 g of sodium silicate and 38 ml of distilled water.

Sodium aluminate solution: 1.5 g of sodium aluminate, and 20 ml of distilled water.

The gel composition in the form of molar ratios of oxides is given below:

| $SiO_2/$ $Al_2O_3$ | $H_2O/SiO_2$ | $OH/SiO_2$ | $Na/SiO_2$ | $Na_2O/$ $SiO_2$ | $SiO_2/Ga_2O_3$ | $Si/Ga$ |
|---|---|---|---|---|---|---|
| 56.01 | 20.57 | 0.14 | 0.76 | 0.38 | 27.08 | 13.54 |

Figure 17:
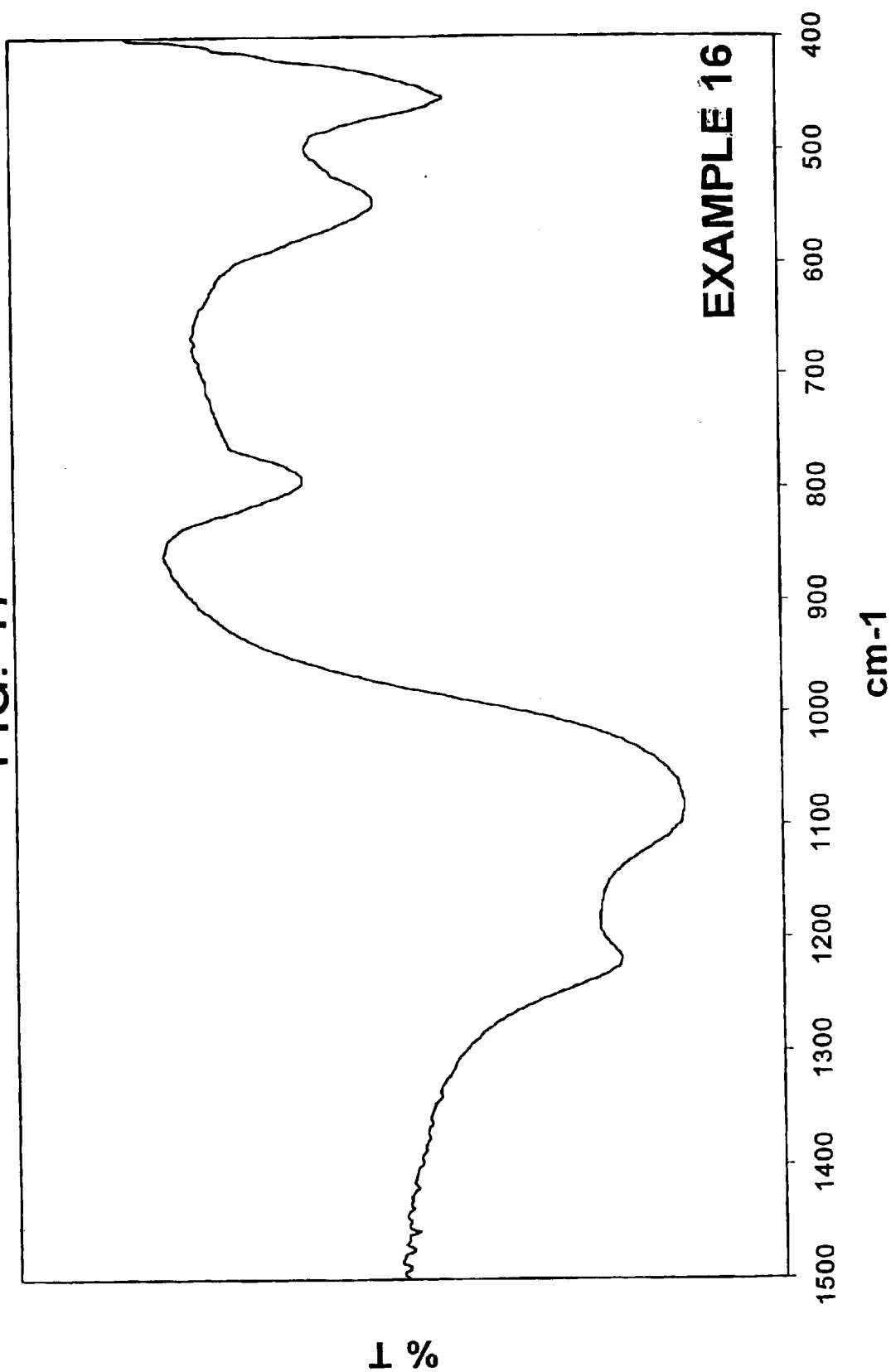
FIG. 17 is an infrared spectrum of the region 400–1500 $cm^{-1}$ of the galloaluminosilicate product of Example 16.

The hydrothermal crystallization was carried out in a stirred 300-ml autoclave to a reaction temperature of 170° C. for a period of 96 hours. The dry material consisted of a pure galloaluminosilicate phase with an X-ray diffraction spectrum with at least the d values listed in Table 2, above. The chemical composition of the white product, expressed in molar ratios, is: $3.41Na_2O:Al_2O_3:2.26Ga_2O_3:84.1SiO_2:41.3H_2O$. The Infrared spectrum of this material is shown in FIG. 17. The $SiO_2/Al_2O_3$ molar ratio of this material is 84.1. It is clear that the gallium is coordinated with the silicon and thus the spectrum is different from a simple silicate or aluminosilicate material of MFI topology.

EXAMPLE 17

Preparation of a chromoaluminosilicate material of the MFI type is illustrated. A reaction batch consisting of the following solutions was prepared according with the procedure described above:

Acid solution of chromium (III) nitrate: 12 g of $Cr(NO_3)_3 \cdot 9H_2O$, 38 ml of $H_2SO_4$ concentrate and 287 ml of distilled water.

Sodium silicate solution: 528 g of sodium silicate and 200 ml of distilled water.

Sodium aluminate solution: 23 g of sodium aluminate and 123 ml of distilled water.

The gel composition in the form of molar ratios of oxides is given below:

| $SiO_2/Al_2O_3$ | $H_2O/SiO_2$ | $OH/SiO_2$ | $Na/SiO_2$ | $Na_2O/SiO_2$ | $SiO_2/Cr_2O_3$ | Si/Cr |
|---|---|---|---|---|---|---|
| 22.69 | 20.67 | 0.13 | 0.81 | 0.40 | 167.55 | 83.77 |

Figure 26:
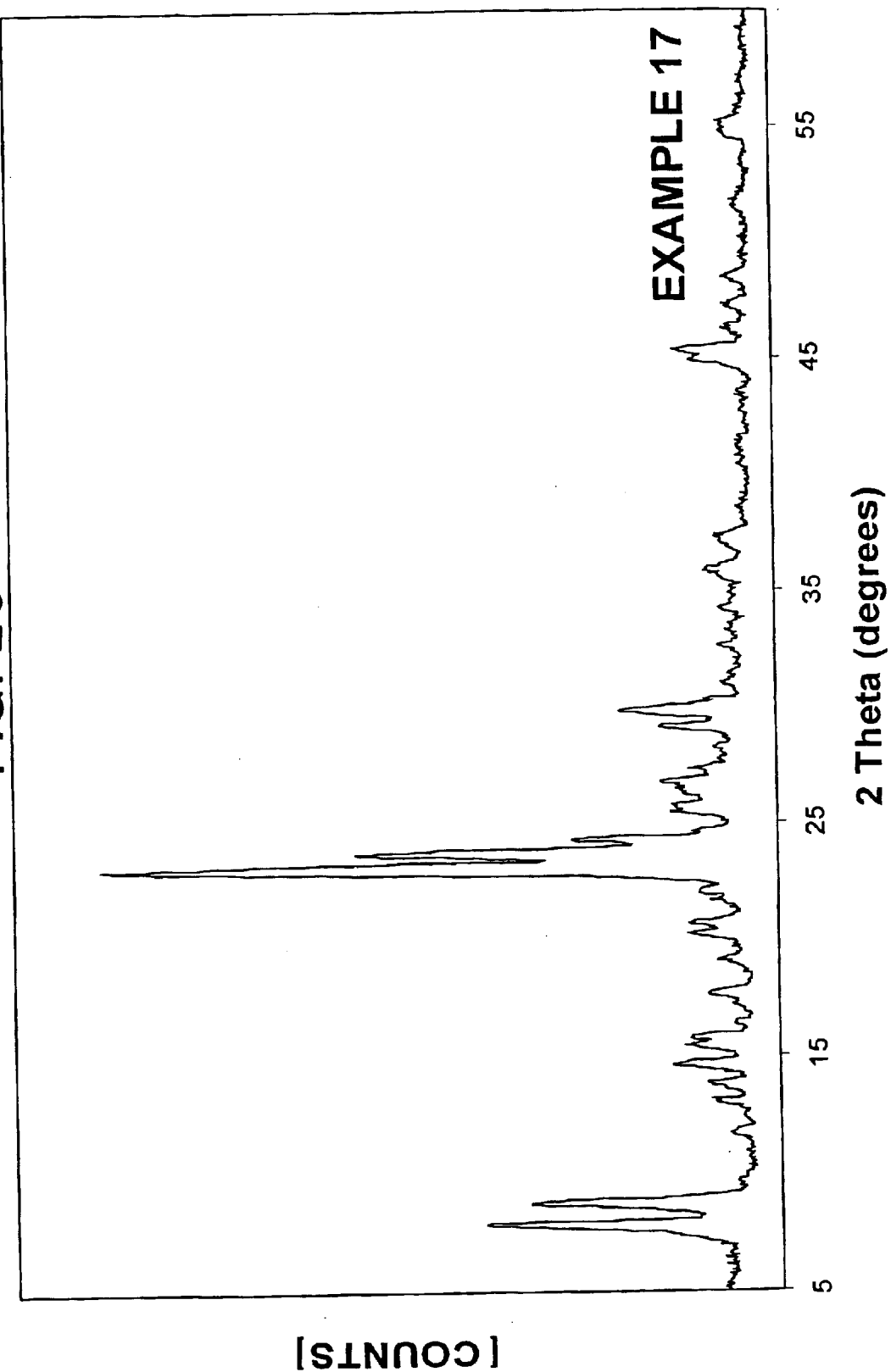
FIG. 26 is an X-ray diffraction diagram of the chromoaluminosilicate product of Example 17.

The hydrothermal crystallization was carried out in a stirred 300-ml autoclave to a reaction temperature of 170° C. for a period of 72 hours. The dry material consisted of a pure Chromoaluminosilicate phase with an X-ray diffraction spectrum with at least the d values listed in Table 2, above. The chemical composition of the pale-green product, expressed in molar ratios, is: $1.21Na_2O:Al_2O_3:0.07Cr_2O_3:24.6SiO_2:6.8H_2O$. The X-ray diagram of this material is shown in FIG. 26.

EXAMPLE 18

Preparation of a chromoaluminosilicate material of the MFI type is illustrated. A reaction batch consisting of the following solutions was prepared according with the procedure described above:

Acid solution of chromium (III) nitrate: 5 g of $Cr(NO_3)_3 \cdot 9H_2O$, 6 ml of $H_2SO_4$ concentrate and 40 ml of distilled water.

Sodium silicate solution: 85 g of sodium silicate and 38 ml of distilled water.

Sodium aluminate solution: 1.7 g of sodium aluminate, 1.6 g of NaOH and 20 ml of distilled water.

The gel composition in the form of molar ratios of oxides is given below:

| $SiO_2/Al_2O_3$ | $H_2O/SiO_2$ | $OH/SiO_2$ | $Na/SiO_2$ | $Na_2O/SiO_2$ | $SiO_2/Cr_2O_3$ | Si/Cr |
|---|---|---|---|---|---|---|
| 49.42 | 20.56 | 0.19 | 0.86 | 0.43 | 64.74 | 32.37 |

Figure 18:
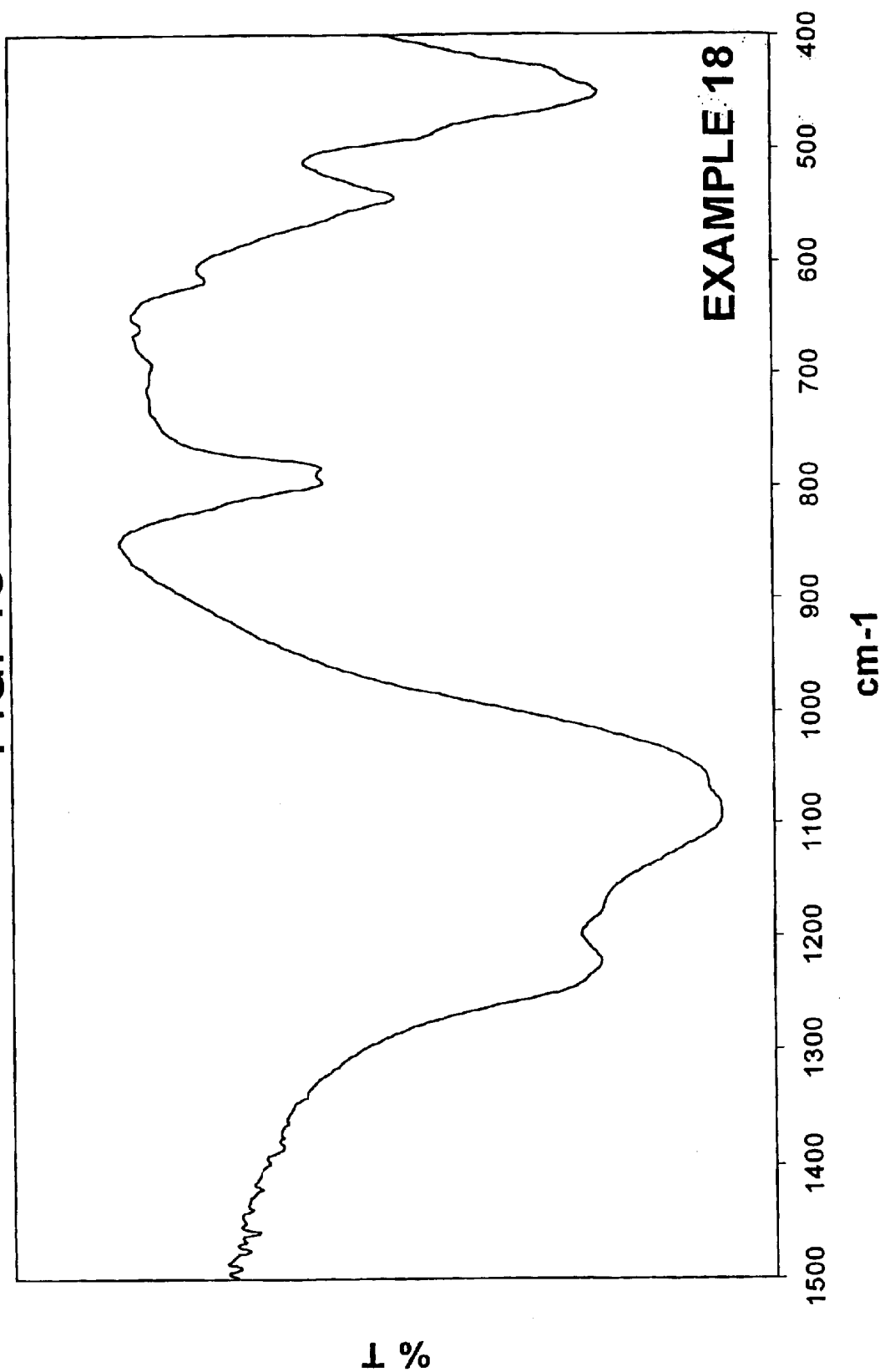
FIG. 18 is an infrared spectrum of the region 400–1500 $cm^{-1}$ of the chromoaluminosilicate product of Example 18.

The hydrothermal crystallization was carried out in a stirred 300-ml autoclave to a reaction temperature of 170° C. for a period of 96 hours. The dry material consisted of a pure Chromoaluminosilicate phase with an X-ray diffraction spectrum with at least the d values listed in Table 2, above. The chemical composition of the pale-green product, expressed in molar ratios, is: $2.40Na_2O:Al_2O_3:0.82Cr_2O_3:53.7SiO_2:35.6H_2O$. The Infrared spectrum of this material is shown in FIG. 18. The $SiO_2/Al_2O_3$ molar ratio of this material is 53.7. It is clear that the chromium is coordinated with the silicon and thus the spectrum is different from a simple silicate or aluminosilicate material of MFI topology.

EXAMPLE 19

Preparation of a magnesoaluminosilicate material of the MFI type is illustrated. A reaction batch consisting of the following solutions was prepared according with the procedure described above:

Acid solution of magnesium (II) nitrate: 1.2 g of $Mg(NO_3)_2 \cdot 6H_2O$, 6.1 ml of $H_2SO_4$ concentrate and 40 ml of distilled water.

Sodium silicate solution: 79.6 g of sodium silicate and 33 ml of water.

Sodium aluminate solution: 3.8 g of sodium aluminate solution and 19 ml of distilled water.

The gel composition in the form of molar ratios of oxides is given below:

| $SiO_2/Al_2O_3$ | $H_2O/SiO_2$ | $OH/SiO_2$ | $Na/SiO_2$ | $Na_2O/SiO_2$ | $SiO_2/MgO$ | Si/Mg |
|---|---|---|---|---|---|---|
| 20.70 | 20.68 | 0.10 | 0.82 | 0.41 | 70.82 | 70.82 |

The hydrothermal crystallization was carried out in a stirred 300-ml autoclave to a reaction temperature of 170° C. for a period of 96 hours. The dry material consisted of a pure magnesoaluminosilicate phase with an X-ray diffraction spectrum with at least the d values listed in Table 2, above. The chemical composition of the white product, expressed in molar ratios, is: $1.11Na_2O:Al_2O_3:0.30MgO:22.1SiO_2:10.6H_2O$.

EXAMPLE 20

Preparation of a magnesoaluminosilicate material of the MFI type is illustrated. A reaction batch consisting of the following solutions was prepared according with the procedure described above:

Acid solution of magnesium (II) nitrate: 3.0 g of $Mg(NO_3)_2 \cdot 6H_2O$, 6.1 ml of $H_2SO_4$ concentrate and 40 ml of distilled water.

Sodium silicate solution: 79.2 g of sodium silicate and 38 ml of water.

Sodium aluminate solution: 2.0 g of sodium aluminate solution and 19 ml of distilled water. The gel composition in the form of molar ratios of oxides is given below:

| $SiO_2/Al_2O_3$ | $H_2O/SiO_2$ | $OH/SiO_2$ | $Na/SiO_2$ | $Na_2O/SiO_2$ | $SiO_2/MgO$ | Si/Mg |
|---|---|---|---|---|---|---|
| 39.14 | 21.43 | 0.14 | 0.84 | 0.42 | 32.21 | 32.21 |

Figure 8:
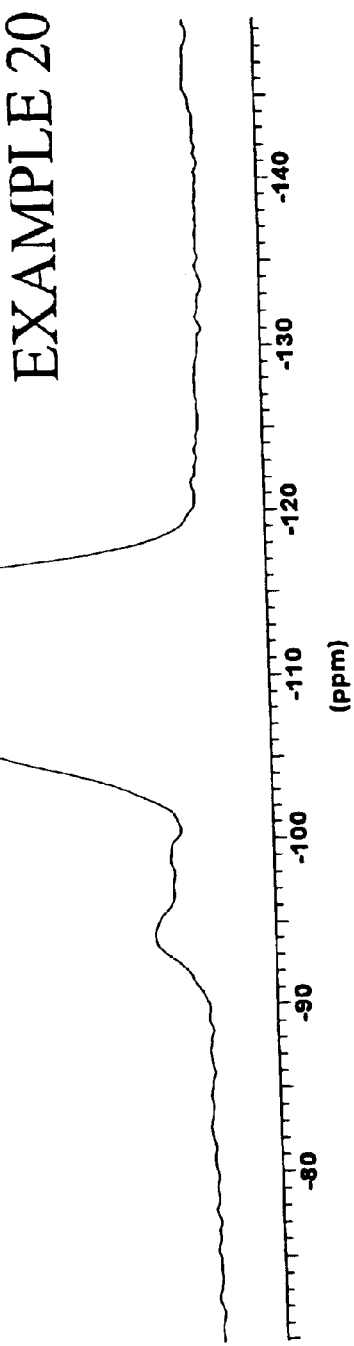
FIG. 8 is a $^{29}$Si NMR spectrum of the magnesoaluminosilicate product of Example 20.

The hydrothermal crystallization was carried out in a stirred 300-ml autoclave to a reaction temperature of 170° C. for a period of 96 hours. The dry material consisted of a pure magnesoaluminosilicate phase with an X-ray diffraction spectrum with at least the d values listed in Table 2, above. The chemical composition of the white product, expressed in molar ratios, is: $2.56Na_2O:Al_2O_3:1.77MgO:52.2SiO_2:25.1H_2O$. The 29Si NMR spectrum of this product is shown in FIG. 8. The $SiO_2/Al_2O_3$ molar ratio of this material is 52.2. It is clear that the magnesium is coordinated with the silicon and thus the spectrum is different from a simple silicate or aluminosilicate material of MFI topology.

Figure 19:
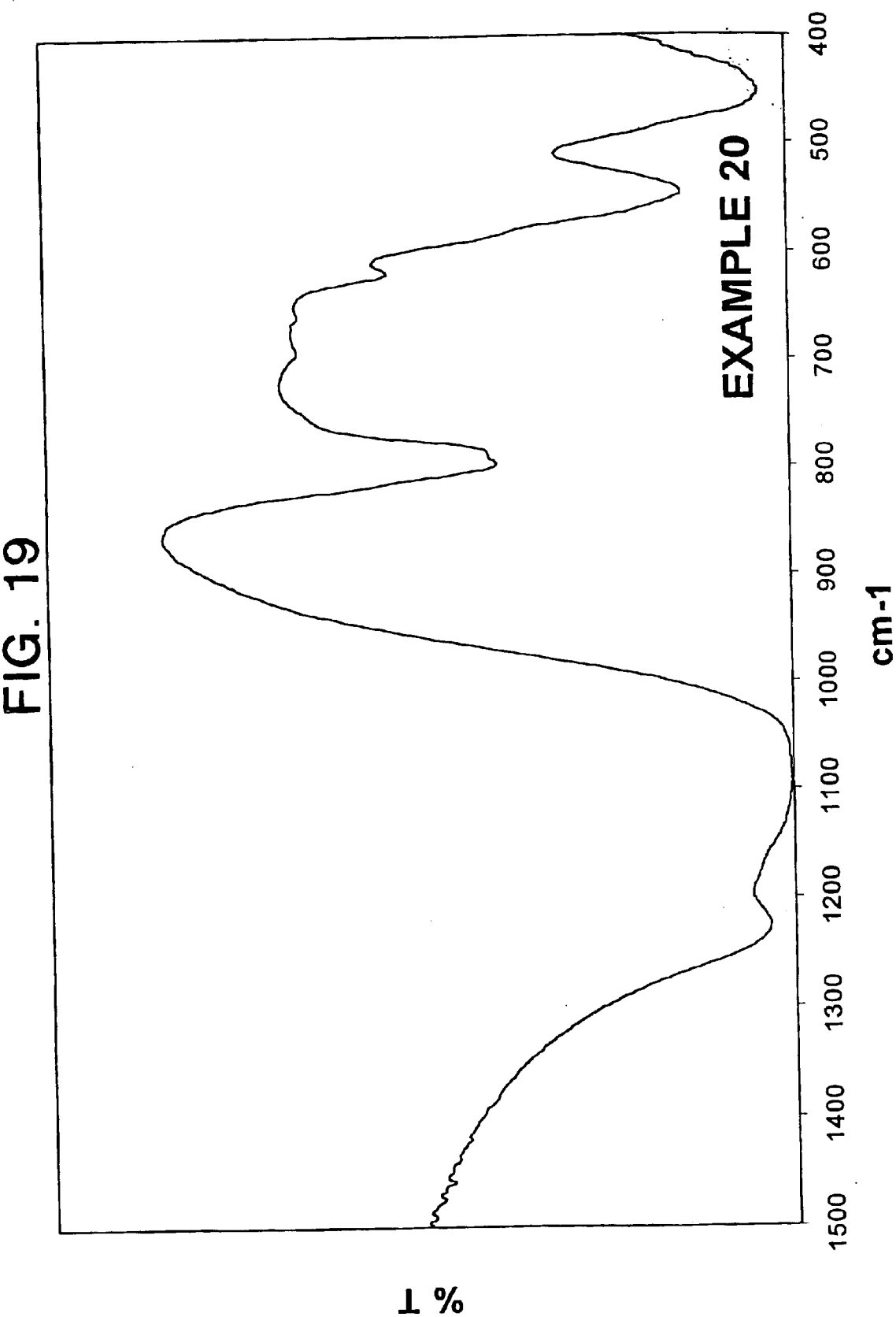
FIG. 19 is an infrared spectrum of the region 400–1500 $cm^{-1}$ of the magnesoaluminosilicate product of Example 20.

The Infrared spectrum of this material is shown in FIG. 19. The $SiO_2/Al_2O_3$ molar ratio of this material is 52.2. It is clear that the magnesium is coordinated with the silicon and thus the spectrum is different from a simple silicate or aluminosilicate material of MFI topology.

Figure 27:
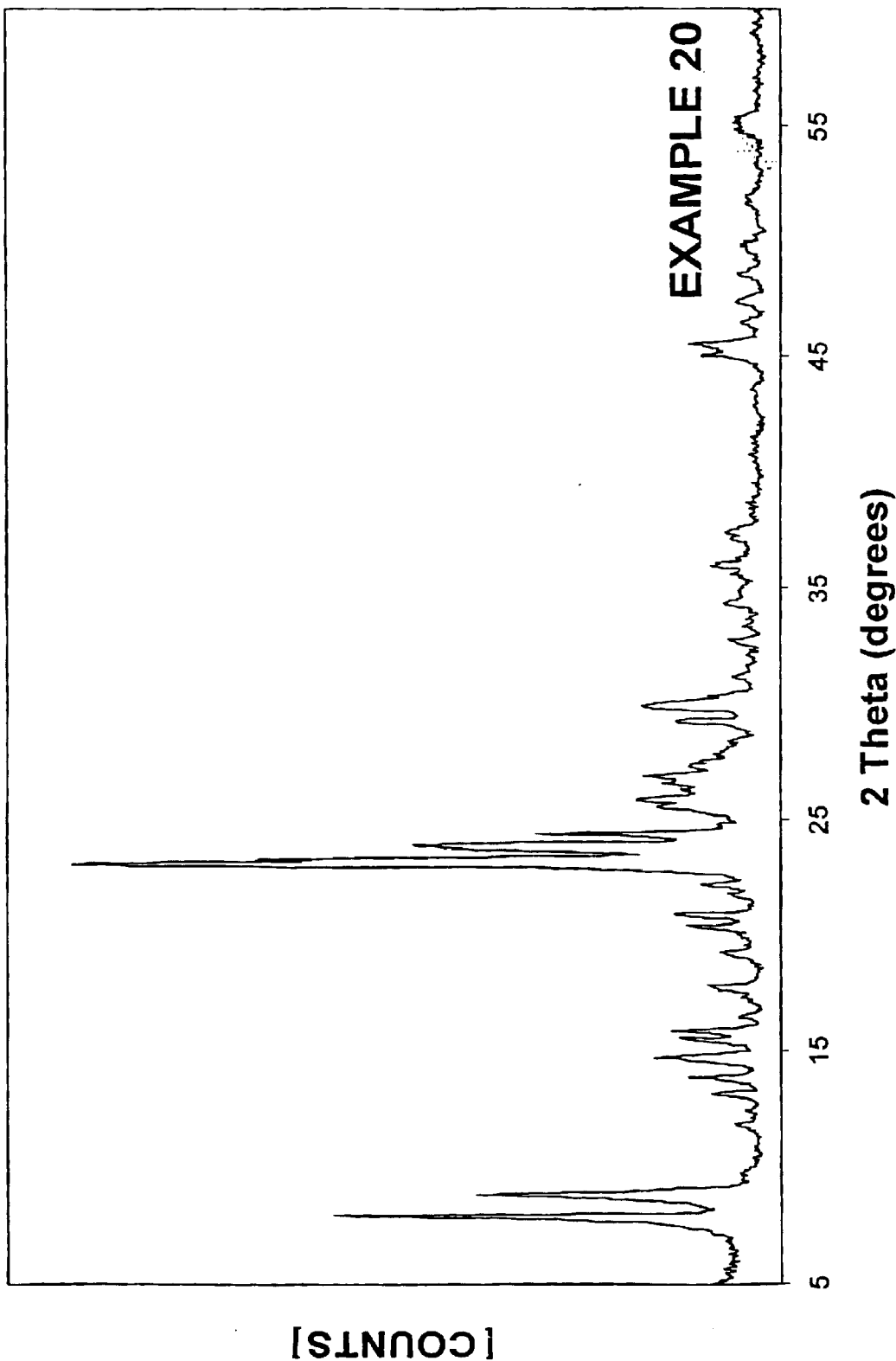
FIG. 27 is an X-ray diffraction diagram of the magnesoaluminosilicate product of Example 20.
Figure 28:
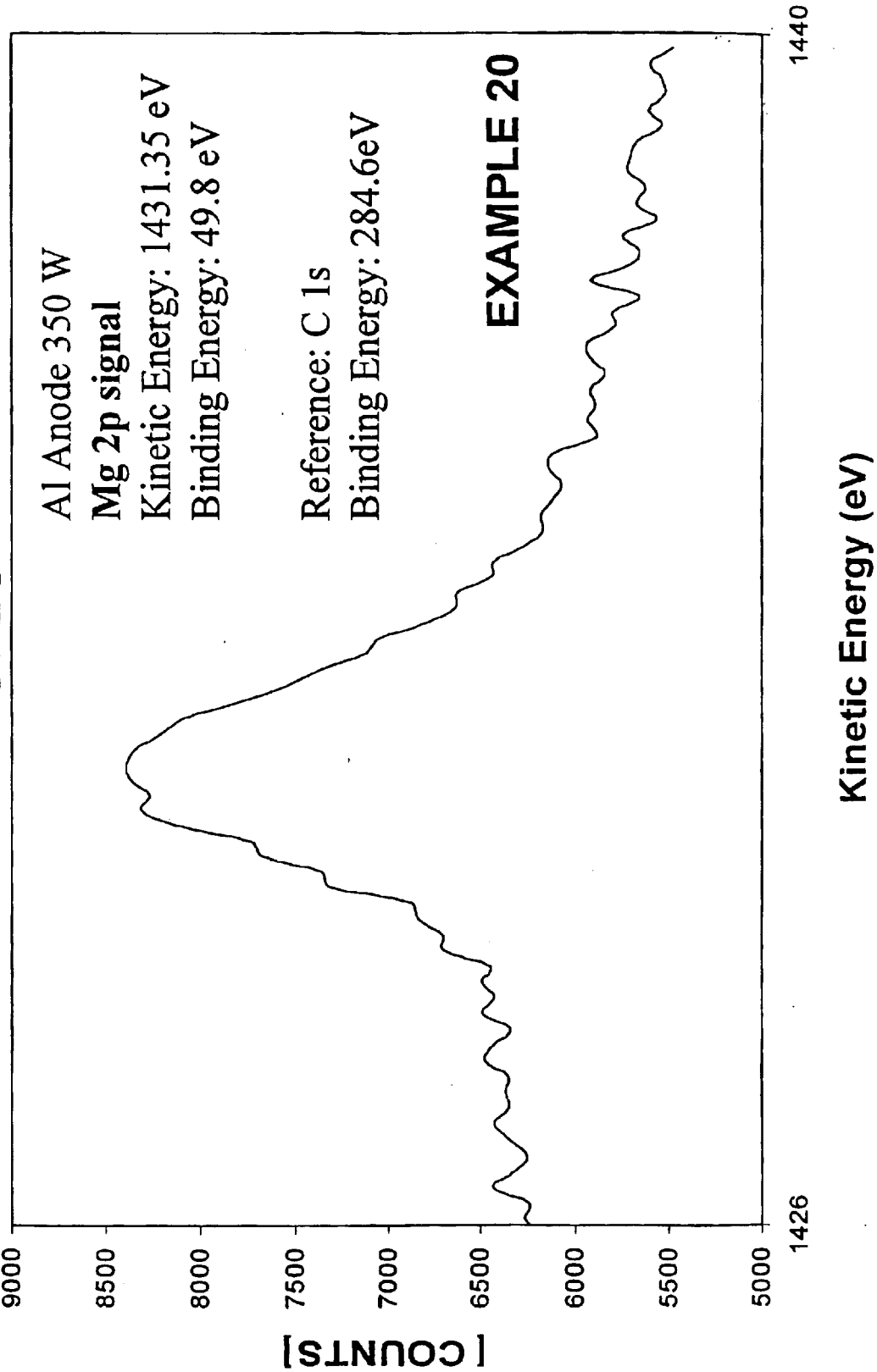
FIG. 28 is an XPS spectrum of the Mg2p region of the magnesoaluminosilicate product of Example 20.

The X-ray diagram of this material is shown in FIG. 27. FIG. 28 shows the XPS spectrum of the Mg 2p region of this product.

EXAMPLE 21

A matrix solution was prepared by mixing 30 parts by weight of commercial Ultra White Kaolin with 70 parts by weight of water. Then, 85 wt % phosphoric acid was added to the mixture to obtain 3 wt % as $P_2O_5$. The mixture was homogenized and the pH was 2.0. Zeolite solution was prepared mixing 30 weight parts of the aluminosilicate composition with MFI topology, with 70 weight parts of water. A portion of the zeolite solution was added to the matrix solution, depending upon the requirement of zeolite content in the final product. The pH of the final mixture was 2.1. The final solution was spray dried at 390° C. inlet temperature, 140° C. outlet temperature. The final spray dried product was calcined one hour at 550° C. The average particle size was 60 microns and the Grace-Davison attrition was 4. Table 4 shows the additives prepared with zeolites containing different elements in the framework structure.

The zeolites of the additives were prepared replacing or substituting the element aluminum of the MFI structure with phosphorus, iron, nickel, zinc, gallium, or chromium, prepared according to the method indicated above.

TABLE 4

| Additive | A | B | C | D | E | F | G | H | I | J |
|---|---|---|---|---|---|---|---|---|---|---|
| Element in zeolite | ... | P | Fe | Ni | Zn | Ga | Ni | Cr | Zr | Zn |
| Element in zeolite, wt. % | ... | 0.08 | 0.08 | 0.08 | 0.08 | 0.08 | 2.0 | 0.4 | 1.5 | 2.0 |
| Zeolite in additive, wt. % | 12.5 | 12.5 | 12.5 | 12.5 | 12.5 | 12.5 | 12.5 | 12.5 | 12.5 | 12.5 |

EXAMPLE 22

One series of additives (Table 5) was prepared according to the method of Example 21. The zeolites used for the preparation had different quantities of the specified element in the framework structure.

TABLE 5

| Additive | C | C2 | C3 | C4 |
|---|---|---|---|---|
| Element in zeolite | Fe | Fe | Fe | Fe |
| Element in zeolite, wt. % | 0.08 | 0.3 | 0.8 | 2 |
| Zeolite in additive, wt. % | 12.5 | 12.5 | 12.5 | 12.5 |

EXAMPLE 23

A mixture of 96 wt. % of a standard commercial FCC catalyst (CB1), See Table 5a, with 4 wt % of an additive prepared as in Example 22 was subjected to steam calcination for 5 hours at 1450° F. (788° C.) in approximately 95% steam/5% air at atmospheric pressure.

TABLE 5a

| CATALYST | |
|---|---|
| PHYSICAL CHARACTERIZATION | |
| BAD, g/cc | 0.823 |
| BCD, g/cc | 0.9394 |
| Attrition Index, % Air Jet | 7.4 |
| Attrition Index, % Jet Cup | 4.8 |
| Pore Volume, cc/g | 0.38 |
| Total, m²/g | 287 |

TABLE 5a-continued

| CATALYST | |
|---|---|
| Zeolite surface area, m²/g | 231 |
| Matrix area, m²/g | 56 |
| Zeolite/Matrix Ratio | 4.13 |
| Crystalinity, % wt | 27 |
| CHEMICAL CHARACTERIZATION | |
| $Al_2O_3$, % wt | 27 |
| $SiO_2$, % wt | 62 |
| $Na_2O$, % wt | 0.14 |
| $Re_2O_3$, % wt | 1.75 |

BAD: bulk average density
BCD: bulk compact density

The mixtures were evaluated using a fixed bed MicroActivity Test (MAT) at 530° C. and a CAT/OIL ratio of 4.01. The properties of the VGO used as feed for this example were as listed in Table 3 above. The results are set forth in Table 6.

TABLE 6

| Additive | ... | A | C | C2 | C3 | C4 |
|---|---|---|---|---|---|---|
| Dry Gas, wt. % | 2.13 | 2.14 | 2.11 | 2.24 | 2.10 | 2.13 |
| LPG, wt % | 14.65 | 16.03 | 18.01 | 18.26 | 16.94 | 17.38 |
| C5-221° C., wt % | 52.00 | 50.53 | 50.91 | 49.83 | 50.72 | 50.60 |
| 221–353° C., wt % | 16.46 | 19.25 | 17.71 | 17.86 | 18.24 | 17.42 |
| 353° C.+, wt % | 9.76 | 8.34 | 7.79 | 8.28 | 7.91 | 7.86 |
| Coke, wt % | 3.60 | 3.70 | 3.47 | 3.53 | 4.09 | 4.60 |
| Conversion, wt % | 73.78 | 72.40 | 74.50 | 73.85 | 73.84 | 74.71 |
| RONGC | 83.84 | 85.05 | 86.12 | 85.79 | 85.48 | 85.90 |
| MONGC | 78.24 | 79.57 | 79.84 | 79.43 | 79.39 | 78.52 |

All additives prepared with the aluminosilicate composition having MFI topology and incorporated metal (C, C2, C3, C4) and the reference additive prepared with an aluminosilicate zeolite without elements in the structure (A), increase the LPG production and the gasoline quality as compared to a base case without additive. Comparing the additives, the introduction of one element as iron in the structure of the zeolite, produces an increase in LPG production, improves conversion of the fractions 353° C.+ and C5–221° C., and produces equal or higher gasoline quality. Table 7 further shows that the commercial additive prepared without elements in the zeolite framework (A) had a Δ(LCO)/−Δ(HCO) ratio higher than the additives prepared with the aluminosilicate composition with MFI topology (C-C4). Inversely, the Δ(LPG)/−Δ(Gasoline) is lower with the iron-containing catalyst composition according to the invention.

TABLE 7

| Additive | Δ (LPG)/-Δ (Gasoline) | Δ (LCO)/-Δ (HCO) |
|---|---|---|
| A | 0.94 | 1.97 |
| C | 3.09 | 0.63 |
| C2 | 1.66 | 0.95 |
| C3 | 1.78 | 0.96 |
| C4 | 1.95 | 0.51 |

=4.4% wt. additive based on catalyst weight

EXAMPLE 24

Using the same conditions as in Example 23, the activity and selectivity of the additives were evaluated with 3% additive by wt. of catalyst, from inventory, of a standard FCC commercial catalyst (CB2). The catalyst or additive based on a Si—Al zeolite (A) was compared with catalysts or additives having additive containing zeolite with Cr (H) and Zr (I). As shown in Table 8, the introduction of these elements in the zeolite structure does not have an important impact on olefin production. The LPG yields are similar to the base case and are lower than those obtained with the additive without elements in the zeolite. However, an important increase in 353° C.+ conversion to C5-221° C. is detected. Also, the RON and MON gasoline quality is similar (I) or higher (H) than the base case but lower than that obtained with the standard additive without elements. The net effect of these elements in the structure of the zeolite with MFI topology is an increased conversion to gasoline with a smaller production of olefins.

TABLE 8

| Additive | ... | A | H | I |
|---|---|---|---|---|
| Dry Gas wt % | 3.03 | 3.12 | 2.96 | 2.81 |
| LPG wt % | 18.04 | 19.81 | 18.25 | 17.88 |
| C5-221° C. wt % | 46.81 | 45.46 | 49.37 | 51.81 |
| 221–353° C. wt % | 18.16 | 17.64 | 17.64 | 17.32 |
| 353° C. + | 8.85 | 8.91 | 6.92 | 5.63 |
| Conversion | 72.99 | 73.45 | 75.44 | 77.06 |
| RONGC | 86.81 | 87.45 | 87.24 | 86.93 |
| MONGC | 79.15 | 80.03 | 80.13 | 79.23 |

*3 wt % of additive. Catalyst CB2

EXAMPLE 25

Using the same conditions and feed of Example 23, the activity and selectivity of additives were evaluated in a Fluidized MicroActivity Test (FMT) at 525° C., CAT/OIL=4, 4% of additive by wt. of catalyst, in inventory, of a standard FCC commercial catalyst (CB3). The additives were prepared with the method described in the Example 21. Table 9 shows the results:

TABLE 9

| Additive | ... | A | B | C | D | E | F |
|---|---|---|---|---|---|---|---|
| LPG | 14.65 | 16.02 | 16.95 | 18.01 | 17.77 | 15.15 | 16.02 |
| C5 – 221° C. | 52.00 | 50.53 | 51.61 | 50.91 | 51.60 | 50.82 | 51.20 |
| 221–353° C. | 16.46 | 19.25 | 17.27 | 17.71 | 16.74 | 18.86 | 18.33 |
| 353° C. + | 9.76 | 8.34 | 8.04 | 7.79 | 7.95 | 9.52 | 9.00 |
| RONGC | 82.6 | 84.6 | 83.4 | 85.5 | 85.3 | 83.3 | 84.6 |
| MONGC | 76.9 | 78.8 | 77.7 | 78.5 | 78.0 | 78.0 | 77.5 |

*12.5 wt % of zeolite. 4 wt % of additive. 0.08 wt % of elements in additive. Catalyst CB3

Additive B, C and D are more active for LPG production than the reference additive A with equal or lower gasoline losses. The introduction of P, Fe and Ni in the zeolite framework produces more 221–353° C. conversion to gasoline and LPG. For the cases E and F (Zn; Ga), the LPG increase is equal to or lower than the base additive A. All the additives increase the gasoline quality, and gasoline produced with C and D have increased octane as compared to results with the reference additive (A).

EXAMPLE 26

Using the conditions and feed of Example 23, gasoline quality was evaluated with a Fluidized MicroActivityTest (FMT) at 525° C., CAT/OIL=4, 4% of additive by wt. of catalyst, from inventory, of a standard FCC commercial catalyst (CB4). The additives were prepared according to the method of Example 21. Table 10 shows the sulfur content in the gasoline product. For the additives G (Ni) and J (Zn) a reduction of sulfur in the gasoline was observed as compared to the reference additive.

TABLE 10

| Additive | A | G | J |
|---|---|---|---|
| S in gasoline, ppm | 1229 | 940 | 919 |

EXAMPLE 27

Evaluations were conducted in a pilot plant at 525° C., CAT/OIL=4 and contact time 3–4s. The additives evaluated were A, C, B and G as shown in Table 11.

TABLE 11

| Element | ... | A | C | B | G |
|---|---|---|---|---|---|
| Dry Gas wt % | 3.73 | 3.39 | 3.42 | 3.79 | 3.40 |
| Propylene | 5.07 | 5.75 | 6.48 | 6.68 | 6.85 |
| Propane | 0.87 | 0.80 | 0.82 | 0.74 | 0.69 |
| i-butene wt % | 0.49 | 0.47 | 0.62 | 0.47 | 0.41 |
| Total butenes wt % | 5.66 | 5.86 | 6.70 | 6.61 | 6.14 |
| Total C4 wt % | 8.85 | 9.40 | 9.41 | 8.72 | 8.57 |
| LPG wt % | 14.80 | 15.96 | 16.71 | 16.14 | 16.11 |
| C5 – 221° C. + wt % | 42.42 | 41.63 | 42.95 | 42.61 | 42.51 |
| 221–353° C. + wt % | 17.51 | 18.88 | 18.95 | 18.88 | 18.85 |
| 353° C. + wt % | 16.43 | 15.93 | 14.69 | 14.91 | 15.06 |
| Conversion wt % | 66.06 | 65.19 | 66.35 | 66.21 | 66.1 |

*12.5 wt % of zeolite. 3 wt % of additive. 0.08 wt % of elements in additive. Catalyst C As shown (MicroActivity Test), the introduction of one element at the zeolite structure of the additive produced more LPG than the additive with a zeolite free of elements. Gasoline production is higher due to an increase of 353° C.+ conversion. Similar to the results obtained with MAT, and shown in Table 7, the ratio (DELTA(LPG)/DELTA (Gasoline) is higher and the DELTA(LCO)/DELTA(HCO) is lower (Table 12). Olefins C3 and C4 selectivity is increased and the C3/C4 ratio is also improved (Table 13). A small change in gasoline octane number is also observed (Table 14).

TABLE 12

| Additive | \| DELTA (LPG)/ DELTA (Gasoline) \| | \| DELTA (LCO)/DELTA (HCO) \| |
|---|---|---|
| A | 1.47 | 2.74 |
| C | 3.60 | 0.83 |

TABLE 12-continued

| Additive | \| DELTA (LPG)/DELTA (Gasoline) \| | \| DELTA (LCO)/DELTA (HCO) \| |
|---|---|---|
| B | 7.05 | 0.90 |
| G | 14.56 | 0.97 |

TABLE 13

| Element | ... | A | C | B | G |
|---|---|---|---|---|---|
| Propylene/Propane | 5.83 | 7.19 | 7.90 | 8.98 | 9.97 |
| Butenes/Butanes | 1.77 | 1.65 | 2.48 | 3.14 | 2.52 |
| C3/C4 | 0.67 | 0.70 | 0.78 | 0.85 | 0.88 |

TABLE 14

| Element | ... | A | C | B | G |
|---|---|---|---|---|---|
| RON MOTOR | 93.80 | 94.30 | 94.20 | 94.40 | 94.60 |
| MON MOTOR | 80.40 | 80.40 | 80.30 | 80.40 | 80.40 |

It should be readily apparent that the catalysts and catalyst additives of the present invention are useful in catalytic cracking processes and can be used to guide the reactions during catalytic cracking toward desired end products and qualities.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for catalytic cracking of a hydrocarbon feed, comprising the steps of:
    providing an initial hydrocarbon fraction having a LPG fraction, a bottom fraction, an isoamylene fraction and an initial sulfur content;
    preparing a catalyst without templating agents and/or seeding procedures, said catalyst comprising a catalyst matrix, an aluminosilicate composition of MFI topology having an aluminosilicate framework and containing at least one metal other than aluminum, wherein the at least one metal has an affective amount incorporated into said aluminosilicate framework to provide an increase in LPG fraction (ALPG) and a decrease in initial sulfur content wherein said aluminosilicate composition is present in an amount between about 0.10 and about 60 wt% based upon said catalyst, said metal is present in an amount between about 0.01 and about 8.0 wt% based on weight of said aluminosilicate composition, and said catalyst matrix is selected from the group consisting of silica, silica-alumina, alumina, clay, pillared clay and combinations thereof said catalyst is provided in the form of fluidizable microspheres; and
    exposing said initial hydrocarbon fraction to said catalyst under fluid catalytic cracking conditions so as to provide an upgraded hydrocarbon product, wherein said upgraded hydrocarbon product has an LPG fraction which contains a higher ratio of olefins to paraffins, a higher ratio of butenes to butanes, a higher ratio of C3 to C4, an increase in LPG fraction (ALPG), a decrease in C5-221° C. fraction (ΔGasoline), and a sulfur content which is less than said initial sulfur content.

2. The process of claim 1, wherein said at least one metal is selected from the group consisting of Group IIA, IIIB, IVB, VB, VIB, VIIB, VIII, IB, IIB, IIIA, IVA and VA of the Period Table of Elements (CAS version).

3. The process of claim 1, wherein said at least one metal is selected from the soup consisting of boron, magnesium, phosphorous, titanium, chromium, iron, cobalt, nickel, copper, zinc, gallium, zirconium and combinations thereof.

4. The process of claim 1, wherein said at least one metal is selected from the group consisting of boron, magnesium, phosphorus, titanium, chromium, iron, nickel, zinc, zirconium and combinations thereof.

5. The process of claim 1, wherein said at least one metal is selected from the group consisting of phosphorous, iron, nickel, zinc and combinations thereof.

6. The process of claim 1, wherein at least one metal is selected from the group consisting of chromium, zirconium and combinations thereof.

7. The process of claim 1, wherein said at least one metal is selected from the group consisting of nickel, zinc and combinations thereof.

8. The process of claim 1, wherein said initial hydrocarbon fraction has a bottom fraction, and wherein said exposing step upgrades said bottom fraction.

9. The process of claim 1, wherein said upgraded hydrocarbon product has an increased isoamylene fraction as compared to said initial hydrocarbon fraction.

10. The process of claim 1, wherein said catalyst is provided in the form of pellets and wherein said exposing step is a thermofor catalytic cracking step.

11. The process of claim 1, wherein said catalyst is provided as an aggregate of microcrystals, said aggregate having an aggregate particle size of between about 2 and about 10 microns, and said microcrystals having a particle size of between about 0.1 and about 1 micron.

12. The process of claim 1, wherein said aluminosilicate is zeolite having a crystal size of between about 1 micron and about 12 microns.

13. The process of claim 1, wherein aluminosilicate is characterized by the following x-ray diffraction pattern:

| Interplaner spacing | Relative intensity |
|---|---|
| 11.2 ± 0.4 | strong |
| 10.0 ± 0.4 | strong |
| 6.01 ± 0.2 | weak |
| 5.72 ± 0.2 | weak |
| 5.58 ± 0.2 | weak |
| 4.38 ± 0.1 | weak |
| 3.86 ± 0.1 | very strong |
| 3.73 ± 0.1 | strong |
| 3.65 ± 0.1 | strong |
| 3.49 ± 0.1 | weak |
| 3.23 ± 0.1 | weak |
| 3.06 ± 0.06 | weak |
| 3.00 ± 0.06 | weak |
| 2.00 ± 0.04 | weak. |

* * * * *